United States Patent
Kim et al.

(10) Patent No.: US 11,963,252 B2
(45) Date of Patent: Apr. 16, 2024

(54) UPLINK DATA FAST TRANSMISSION IN CU-DU SPLIT

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/419,452

(22) PCT Filed: Dec. 30, 2019

(86) PCT No.: PCT/KR2019/018718
§ 371 (c)(1),
(2) Date: Jun. 29, 2021

(87) PCT Pub. No.: WO2020/171369
PCT Pub. Date: Aug. 27, 2020

(65) Prior Publication Data
US 2022/0086944 A1    Mar. 17, 2022

(30) Foreign Application Priority Data
Feb. 19, 2019    (KR) .......... 10-2019-0019121

(51) Int. Cl.
*H04W 76/27* (2018.01)
*H04W 76/34* (2018.01)

(52) U.S. Cl.
CPC .......... *H04W 76/27* (2018.02); *H04W 76/34* (2018.02)

(58) Field of Classification Search
CPC ... H04W 24/10; H04W 72/044; H04W 72/23; H04W 36/0088
See application file for complete search history.

(56) References Cited

U.S. PATENT DOCUMENTS

| | | | |
|---|---|---|---|
| 2015/0036660 A1* | 2/2015 | Bi ............ | H04W 36/0011 370/331 |
| 2018/0139778 A1 | 5/2018 | Chou et al. | |

(Continued)

FOREIGN PATENT DOCUMENTS

WO    2017123428    7/2017

OTHER PUBLICATIONS

3GPP TS 38.401 V15.4.0, 3GPP TSG RAN; NG-RAN; Architecture description, Release 15, Jan. 8, 2019, sections 8.6.1-8.6.2, and figures 8.6.1-1, 8.6.2-1.

(Continued)

*Primary Examiner* — Ian N Moore
*Assistant Examiner* — Sun Jong Kim
(74) *Attorney, Agent, or Firm* — BRYAN CAVE LEIGHTON PAISNER LLP

(57) ABSTRACT

A method for performing uplink data fast transmission. The method includes receiving a UE context release message including a user plane ID (UPID) from control plane (CP) of a central unit (CU) of the network node, forwarding the UPID via a radio resource control (RRC) connection release message to a wireless device, receiving a RRC resume request message including user data with the UPID from the wireless device, transmitting the user data to CU based on the UPID.

13 Claims, 19 Drawing Sheets

(56) References Cited

U.S. PATENT DOCUMENTS

| | | | |
|---|---|---|---|
| 2018/0234941 A1 | 8/2018 | Kim et al. | |
| 2018/0343698 A1* | 11/2018 | Mitsui | H04W 76/20 |
| 2018/0368205 A1* | 12/2018 | Park | H04W 76/30 |
| 2020/0029262 A1* | 1/2020 | Kim | H04W 74/0833 |
| 2020/0229049 A1* | 7/2020 | Wu | H04W 88/085 |
| 2020/0344843 A1* | 10/2020 | Zhu | H04W 40/22 |

OTHER PUBLICATIONS

Huawei et al., Discussion on W1AP UE Context Management procedures, R3-190613, 3GPP TSG-RAN WG3 Meeting #103, Athens, Greece, Feb. 15, 2019, section 2.

* cited by examiner

UPLINK DATA FAST TRANSMISSION IN CU-DU SPLIT

This application is the National Stage filing under 35 U.S.C. 371 of International Application No. PCT/KR2019/018718 filed on Dec. 30, 2019, which claims priority to Korean Patent Application No. 10-2019-0019121 filed on Feb. 19, 2019, the contents of which are hereby incorporated by reference herein in their entirety.

TECHNICAL FIELD

The present disclosure relates to uplink data transmission.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

SUMMARY

According to the prior art, when the DU receives a UE context release message from the CU in the CU-DU split circumstances, the DU is configured to delete information about the UE. If the EDT is initiated while the DU does not have information on the UE, an additional procedure may be required to secure the information on the UE.

According to an embodiment of the present disclosure, a method performed by a wireless device in a wireless communication system is provided. The method may comprise receiving a UE context release message including a user plane ID (UPID) from control plane (CP) of a central unit (CU) of the network node, forwarding the UPID via a radio resource control (RRC) connection release message to a wireless device, receiving a RRC resume request message including user data with the UPID from the wireless device, transmitting the user data to CU based on the UPID.

The present disclosure can have various advantageous effects.

For example, the DU may quickly deliver to the CU-UP the MO data due to the UE assisted information. Therefore, the UE's experience may be improved since the unnecessary latency due to the data retransmission can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
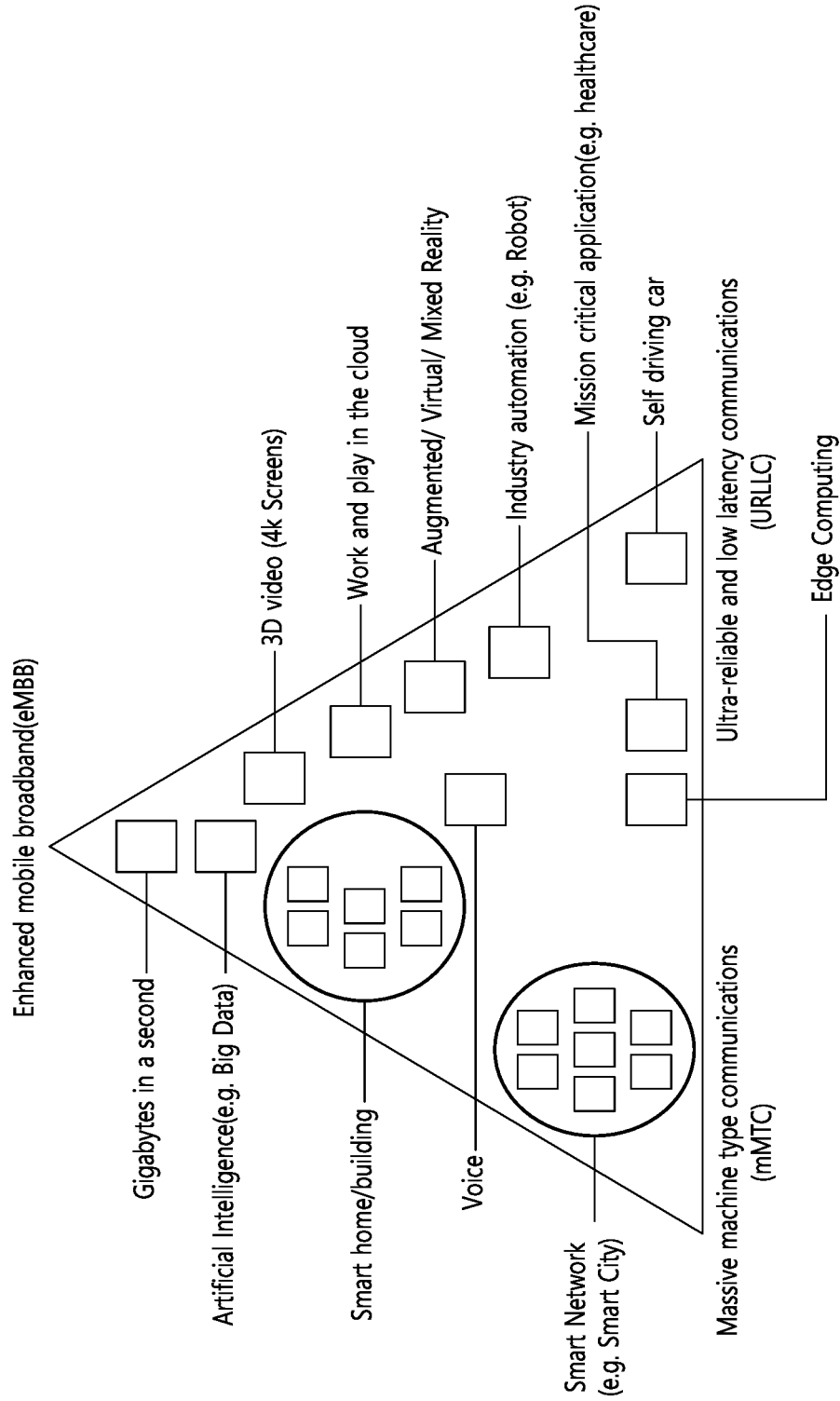
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
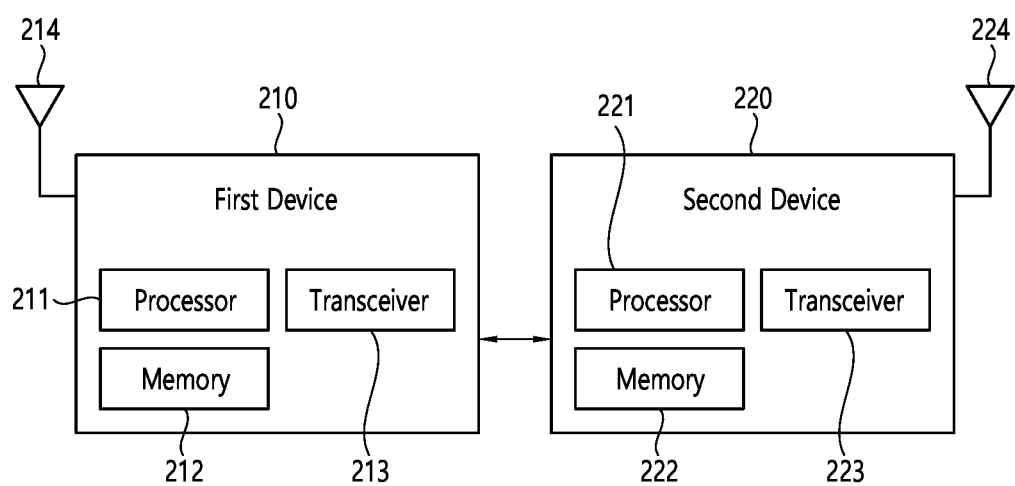
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
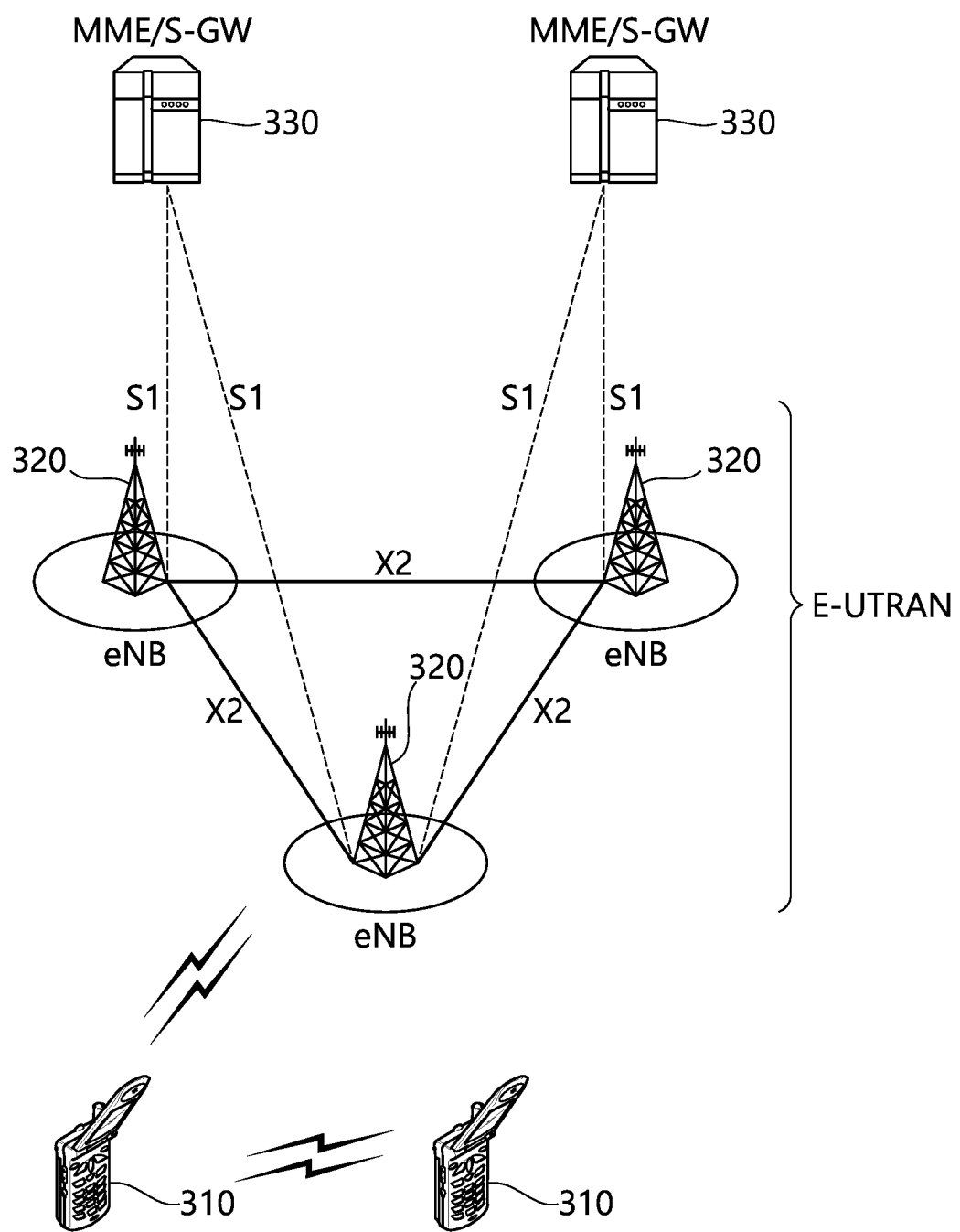
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc. The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
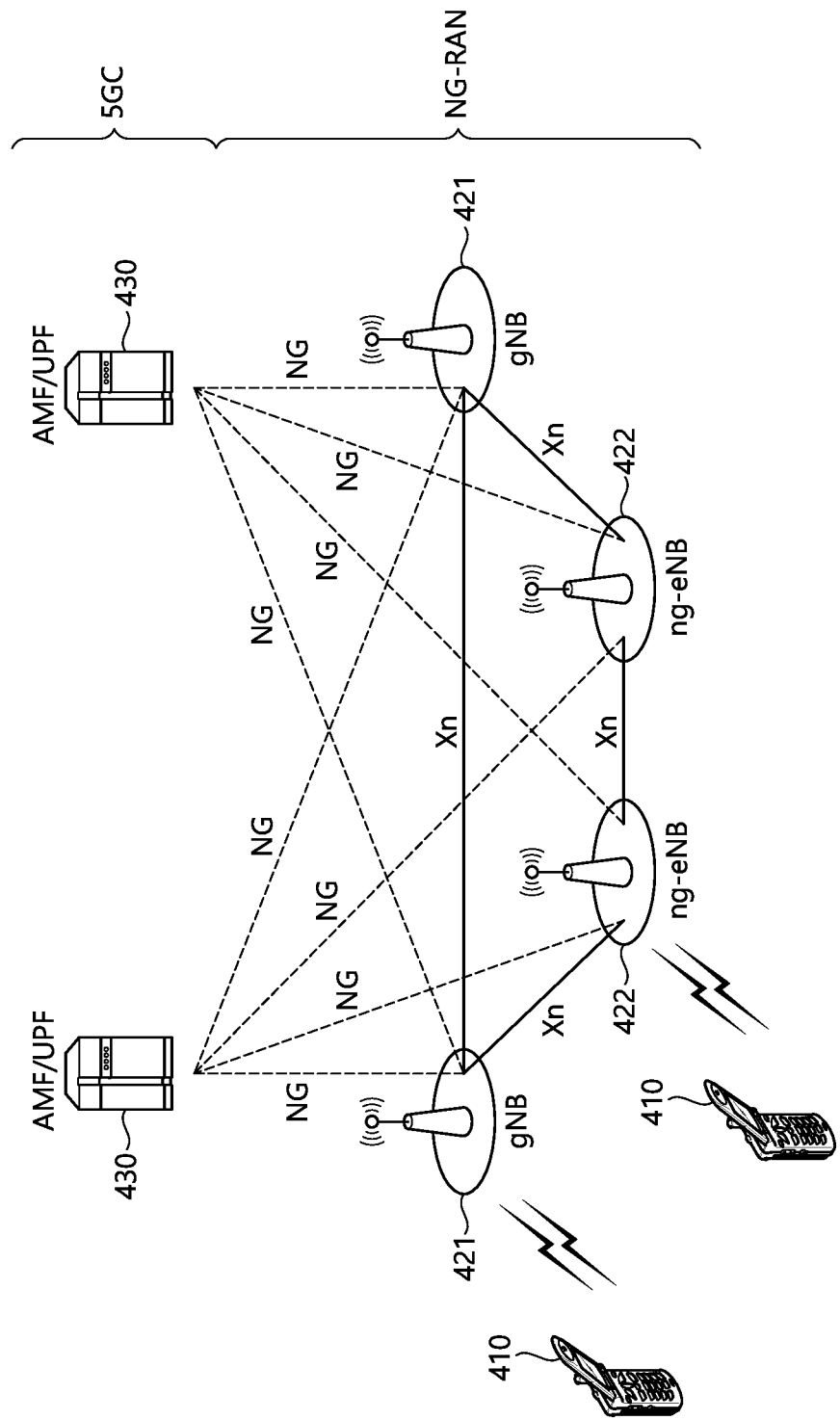
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
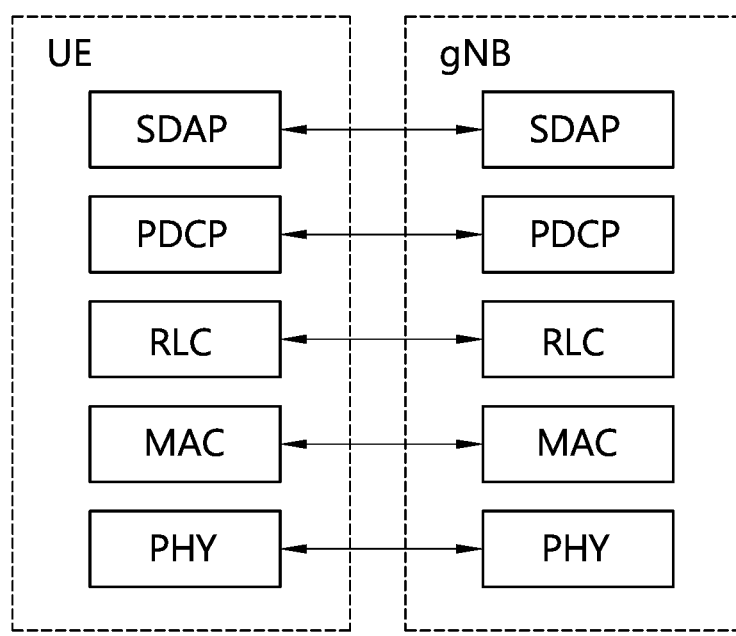
FIG. 5 shows a block diagram of a user plane protocol stack to which the technical features of the present disclosure can be applied.
Figure 6:
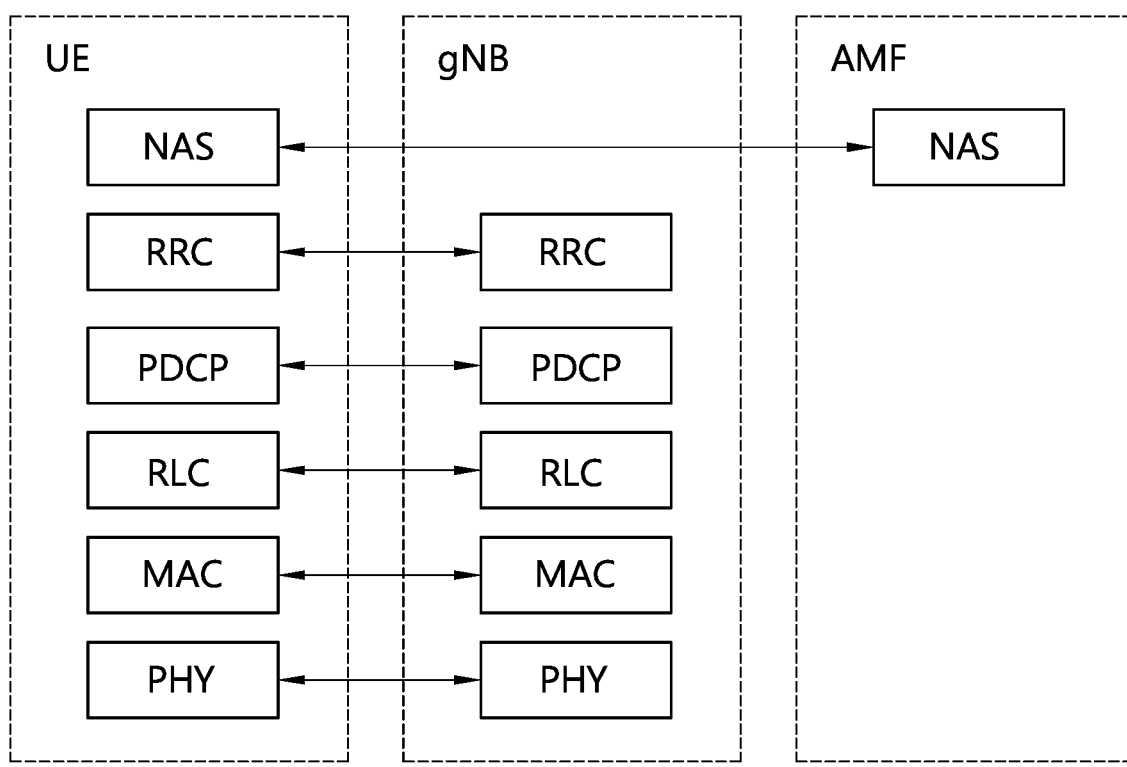
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels. The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots. The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH.

In UL, CCCH can be mapped to UL-SCH, DCCH can be mapped to UL-SCH, and DTCH can be mapped to UL-SCH.

Hereinafter, random access procedure is described.

The Random Access procedure is initiated by a PDCCH order, by the MAC sublayer itself or by the RRC sublayer. Random Access procedure on a SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage, unless explicitly stated otherwise:

the available set of PRACH resources for the transmission of the Random Access Preamble, prach-ConfigIndex.

the groups of Random Access Preambles and the set of available Random Access Preambles in each group (SpCell only):

The preambles that are contained in Random Access Preambles group A and Random Access Preambles group B are calculated from the parameters numberOfRA-Preambles and sizeOfRA-PreamblesGroupA:

If sizeOfRA-PreamblesGroupA is equal to numberOfRA-Preambles then there is no Random Access Preambles group B. The preambles in Random Access Preamble group A are the preambles 0 to sizeOfRA-PreamblesGroupA-| and, if it exists, the preambles in Random Access Preamble group B are the preambles sizeOfRA-PreamblesGroupA to numberOfRA-Preambles—1 from the set of 64 preambles.

if Random Access Preambles group B exists, the thresholds, messagePowerOffsetGroupB and messageSizeGroupA, the configured UE transmitted power of the Serving Cell performing the Random Access Procedure, PCMAX, c, and the offset between the preamble and Msg3, deltaPreambleMsg3, that are required for selecting one of the two groups of Random Access Preambles (SpCell only).

the RA response window size ra-ResponseWindowSize.

the power-ramping factor powerRampingStep.

the maximum number of preamble transmission preambleTransMax.

the initial preamble power preambleInitialReceivedTargetPower.

the preamble format based offset DELTA_PREAMBLE.

the maximum number of Msg3 HARQ transmissions maxHARQ-Msg3Tx (SpCell only).

the Contention Resolution Timer mac-ContentionResolutionTimer (SpCell only).

The above parameters may be updated from upper layers before each Random Access procedure is initiated.

The following information for related Serving Cell is assumed to be available before the procedure can be initiated for NB-IoT UEs, BL UEs or UEs in enhanced coverage:
- if the UE is a BL UE or a UE in enhanced coverage:
  - the available set of PRACH resources associated with each enhanced coverage level supported in the Serving Cell for the transmission of the Random Access Preamble, prach-ConfigIndex.
  - for EDT, the available set of PRACH resources associated with EDT for each enhanced coverage level supported in the Serving Cell for the transmission of the Random Access Preamble, prach-ConfigIndex.
  - the groups of Random Access Preambles and the set of available Random Access Preambles in each group (SpCell only):
    - If sizeOfRA-PreamblesGroupA is not equal to numberOfRA-Preambles:
    - Random Access Preambles group A and B exist and are calculated as above;
    - else:
    - the preambles that are contained in Random Access Preamble groups for each enhanced coverage level, if it exists, are the preambles firstPreamble to lastPreamble.
  - When a PRACH resource is shared for multiple enhanced coverage levels, and enhanced coverage levels are differentiated by different preamble indices, Group A and Group B is not used for this PRACH resource.
- if the UE is an NB-IoT UE:
  - the available set of PRACH resources supported in the Serving Cell on the anchor carrier, nprach-ParametersList, and on the non-anchor carriers, in ul-ConfigList.
  - for EDT, the available set of PRACH resources associated with EDT on anchor carrier, nprach-ParametersList-EDT, and on the non-anchor carriers, in ul-ConfigList.
- for random access resource selection and preamble transmission:
  - a PRACH resource is mapped into an enhanced coverage level.
  - each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers. Each group is referred to as a Random Access Preamble group below in the procedure text.
  - a subcarrier is identified by the subcarrier index in the range:
  - [nprach-SubcarrierOffset, nprach-SubcarrierOffset+nprach-NumSubcarriers−1]
  - each subcarrier of a Random Access Preamble group corresponds to a Random Access Preamble.
  - when the subcarrier index is explicitly sent from the eNB as part of a PDCCH order ra-PreambleIndex shall be set to the signalled subcarrier index.
  - the mapping of the PRACH resources into enhanced coverage levels is determined according to the following:
  - the number of enhanced coverage levels is equal to one plus the number of RSRP thresholds present in rsrp-ThresholdsPrachInfoList.
  - each enhanced coverage level has one anchor carrier PRACH resource present in nprach-ParametersList and zero or one PRACH resource for each non-anchor carrier signalled in ul-ConfigList.
  - for EDT, each enhanced coverage level has zero or one anchor carrier PRACH resource present in nprach-ParametersList-EDT and zero or one PRACH resource for each non-anchor carrier signalled in ul-ConfigList.
  - enhanced coverage levels are numbered from 0 and the mapping of PRACH resources to enhanced coverage levels are done in increasing numRepetitionsPerPreambleAttempt order.
  - when multiple carriers provide PRACH resources for the same enhanced coverage level, the UE will randomly select one of them using the following selection probabilities:
  - the selection probability of the anchor carrier PRACH resource for the given enhanced coverage level, nprach-ProbabilityAnchor, is given by the corresponding entry in nprach-ProbabilityAnchorList
  - the selection probability is equal for all non-anchor carrier PRACH resources and the probability of selecting one PRACH resource on a given non-anchor carrier is (1-nprach-ProbabilityAnchor)/(number of non-anchor NPRACH resources)
- the criteria to select PRACH resources based on RSRP measurement per enhanced coverage level supported in the Serving Cell rsrp-ThresholdsPrachInfoList.
- the maximum number of preamble transmission attempts per enhanced coverage level supported in the Serving Cell maxNumPreambleAttemptCE.
- the number of repetitions required for preamble transmission per attempt for each enhanced coverage level supported in the Serving Cell numRepetitionPerPreambleAttempt.
- the configured UE transmitted power of the Serving Cell performing the Random Access Procedure, PCMAX, c.
- the RA response window size ra-ResponseWindowSize and the Contention Resolution Timer mac-ContentionResolutionTimer (SpCell only) per enhanced coverage level supported in the Serving Cell.
- for EDT, the Contention Resolution Timer mac-ContentionResolutionTimer configured for EDT (SpCell only) per enhanced coverage level supported in the Serving Cell.
- the power-ramping factor powerRampingStep and optionally powerRampingStepCE1.
- the maximum number of preamble transmission preambleTransMax-CE.
- the initial preamble power preambleInitialReceivedTargetPower and optionally preambleInitialReceivedTargetPowerCE1.
- the preamble format based offset DELTA_PREAMBLE. For NB-IoT the DELTA_PREAMBLE is set to 0.
- for NB-IoT, the use of contention free random access ra-CFRA-Config.

The Random Access procedure shall be performed as follows:
- Flush the Msg3 buffer;
- set the PREAMBLE_TRANSMISSION_COUNTER to 1;
- if the UE is an NB-IoT UE, a BL UE or a UE in enhanced coverage:
  - set the PREAMBLE_TRANSMISSION_COUNTER_CE to 1;
- if the starting enhanced coverage level, or for NB-IoT the starting number of NPRACH repetitions, has been indicated in the PDCCH order which initiated the Random Access procedure, or if the starting enhanced coverage level has been provided by upper layers:

the MAC entity considers itself to be in that enhanced coverage level regardless of the measured RSRP;

else:

if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:

the MAC entity considers to be in enhanced coverage level 3;

else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:

the MAC entity considers to be in enhanced coverage level 2;

else if the measured RSRP is less than the RSRP threshold of enhanced coverage level 1 as configured by upper layers in rsrp-ThresholdsPrachInfoList then:

the MAC entity considers to be in enhanced coverage level 1;

else:

the MAC entity considers to be in enhanced coverage level 0;

set the backoff parameter value to 0 ms;

for the RN, suspend any RN subframe configuration;

proceed to the selection of the Random Access Resource.

There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

An NB-IoT UE measures RSRP on the anchor carrier.

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or

Temporary C-RNTI, the MAC entity shall for each TTI during which it monitors PDCCH and for each Serving Cell:

if a downlink assignment for this TTI and this Serving Cell has been received on the PDCCH for the MAC entity's C-RNTI, or Temporary C-RNTI:

if this is the first downlink assignment for this Temporary C-RNTI:

consider the NDI to have been toggled.

if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:

consider the NDI to have been toggled regardless of the value of the NDI.

indicate the presence of a downlink assignment and deliver the associated HARQ information to the HARQ entity for this TTI.

else, if this Serving Cell is the SpCell and a downlink assignment for this TTI has been received for the SpCell on the PDCCH of the SpCell for the MAC entity's Semi-Persistent Scheduling C-RNTI:

if the NDI in the received HARQ information is 1:

consider the NDI not to have been toggled;

indicate the presence of a downlink assignment and deliver the associated HARQ information to the HARQ entity for this TTI.

else, if the NDI in the received HARQ information is 0:

if PDCCH contents indicate SPS release:

clear the configured downlink assignment (if any);

if the timeAlignmentTimer associated with the pTAG is running:

indicate a positive acknowledgement for the downlink SPS release to the physical layer.

else:

store the downlink assignment and the associated HARQ information as configured downlink assignment;

initialise (if not active) or re-initialise (if already active) the configured downlink assignment to start in this TTI and to recur according to rules;

set the HARQ Process ID to the HARQ Process ID associated with this TTI;

consider the NDI bit to have been toggled;

indicate the presence of a configured downlink assignment and deliver the stored HARQ information to the HARQ entity for this TTI.

else, if this Serving Cell is the SpCell and a downlink assignment for this TTI has been configured for the SpCell and there is no measurement gap in this TTI and there is no Sidelink Discovery Gap for Reception in this TTI; and if this TTI is not an MBSFN subframe of the SpCell or the MAC entity is configured with transmission mode tm9 or tm10 on the SpCell:

instruct the physical layer to receive, in this TTI, transport block on the DL-SCH according to the configured downlink assignment and to deliver it to the HARQ entity;

set the HARQ Process ID to the HARQ Process ID associated with this TTI;

consider the NDI bit to have been toggled;

indicate the presence of a configured downlink assignment and deliver the stored HARQ information to the HARQ entity for this TTI.

if the MAC entity is configured with rach-Skip or rach-SkipSCG and a UE Contention Resolution Identity MAC control element for this TTI has been received on the PDSCH indicated by the PDCCH of the SpCell addressed to the C-RNTI:

indicate to upper layer the successful reception of a PDCCH transmission addressed to the C-RNTI.

Early data transmission (EDT) is described.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

EDT for Control Plane CIoT EPS optimizations is characterized as below:

Uplink user data are transmitted in a NAS message concatenated in UL RRCEarlyDataRequest message on CCCH;

Downlink user data are optionally transmitted in a NAS message concatenated in DL RRCEarlyDataComplete message on CCCH;

There is no transition to RRC CONNECTED.

The EDT procedure for Control Plane CIoT EPS optimizations is described as below.

1. Upon connection establishment request for Mobile Originated data from the upper layers, the UE initiates the early data transmission procedure and selects a random access preamble configured for EDT.
2. UE sends RRCEarlyDataRequest message concatenating the user data on CCCH.
3. The eNB initiates the S1-AP Initial UE message procedure to forward the NAS message and establish the S1 connection. The eNB may indicate in this procedure that this connection is triggered for EDT.
4. The MME requests the S-GW to re-activate the EPS bearers for the UE.
5. The MME sends the uplink data to the S-GW.
6. If downlink data are available, the S-GW sends the downlink data to the MME.
7. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.
8. If no further data are expected, the eNB can send the RRCEarlyDataComplete message on CCCH to keep the UE in RRC_IDLE. If downlink data were received in step 7, they are concatenated in RRCEarlyDataComplete message.
9. The S1 connection is released and the EPS bearers are deactivated.

If the MME or the eNB decides to move the UE in RRC_CONNECTED mode, RRCConnectionSetup message is sent in step 8 to fall back to the legacy RRC Connection establishment procedure; the eNB will discard the zero-length NAS PDU received in msg5.

EDT for User Plane CIoT EPS optimizations is characterized as below:

Uplink user data are transmitted on DTCH multiplexed with UL RRCConnectionResumeRequest message on CCCH;

Downlink user data are optionally transmitted on DTCH multiplexed with DL RRCConnectionRelease message on DCCH;

The user data in uplink and downlink are ciphered. The keys are derived using the NextHopChainingCount provided in the RRCConnectionRelease message of the previous RRC connection;

There is no transition to RRC CONNECTED.

The EDT procedure for User Plane CIoT EPS optimizations is described as below.

0. Upon connection resumption request for Mobile Originated data from the upper layers, the UE initiates the early data transmission procedure and selects a random access preamble configured for EDT.
1. The UE sends an RRCConnectionResumeRequest to the eNB, including its Resume ID, the establishment cause, and an authentication token. The UE resumes all SRBs and DRBs, derives new security keys using the NCC provided in the RRCConnectionRelease message of the previous connection and re-establishes the AS security. The user data are ciphered and transmitted on DTCH multiplexed with the RRCConnectionResumeRequest message on CCCH.
2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can send the RRCConnectionRelease message to keep (FFS transit) the UE in RRC_IDLE. The message includes the releaseCause set to rrc-Suspend, the resumeID and the NextHopChainingCount which are stored by the UE. If downlink data were received in step 6, they are sent ciphered on DTCH multiplexed with the RRCConnectionRelease message on DCCH.
8. The S1 connection is suspended and the S1-U bearers are deactivated.

If the MME or eNB decides the UE to move in RRC_CONNECTED mode, RRCConnectionResume message is sent in step 7 to fall back to the legacy RRC Connection resume procedure.

Figure 7:
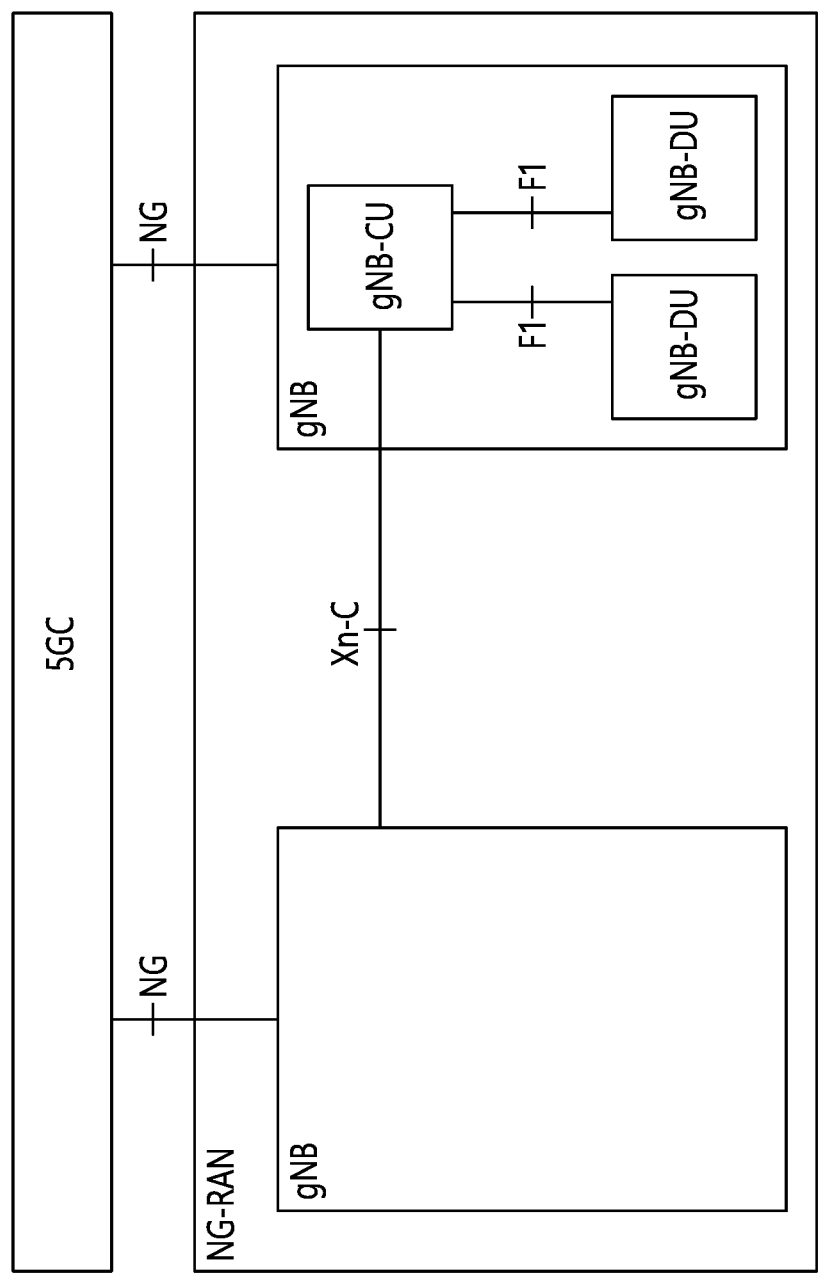
FIG. 7 shows an example of the overall architecture of an NG-RAN.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The node hosting user plane part of NR PDCP (e.g., gNB-CU, gNB-CU-UP, and for EN-DC, MeNB or SgNB depending on the bearer split) shall perform user inactivity monitoring and further informs its inactivity or (re)activation to the node having C-plane connection towards the core network (e.g., over E1, X2). The node hosting NR RLC (e.g., gNB-DU) may perform user inactivity monitoring and further inform its inactivity or (re)activation to the node hosting control plane, e.g., gNB-CU or gNB-CU-CP.

UL PDCP configuration (i.e., how the UE uses the UL at the assisting node) is indicated via X2-C(for EN-DC), Xn-C(for NG-RAN) and F1-C. Radio Link outage/resume for DL and/or UL is indicated via X2-U (for EN-DC), Xn-U (for NG-RAN) and F1-U.

The NG-RAN is layered into a radio network layer (RNL) and a transport network layer (TNL).

The NG-RAN architecture, i.e., the NG-RAN logical nodes and interfaces between them, is defined as part of the RNL.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration Update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging attempt (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

For UP CIoT optimization in NR, the key issue has been studied for the frequent small data communication. Specifically, it is introduced to optimize small data transmission for the UEs from CM-IDLE mode. It is proposed to keep AS context in the NG-RAN including information the UPF connection and relevant QoS flow(s) to be used for the connection, even when UE moves into CM-IDLE. When UE resumes the connection, the NG-RAN uses the information to activate DRB, AS security and User Plane connectivity over NG-U for the small data packet delivery to the UPF. The UPF also keeps NG-U tunnel information for the PDU session to allow UL data transmission.

Figure 8:
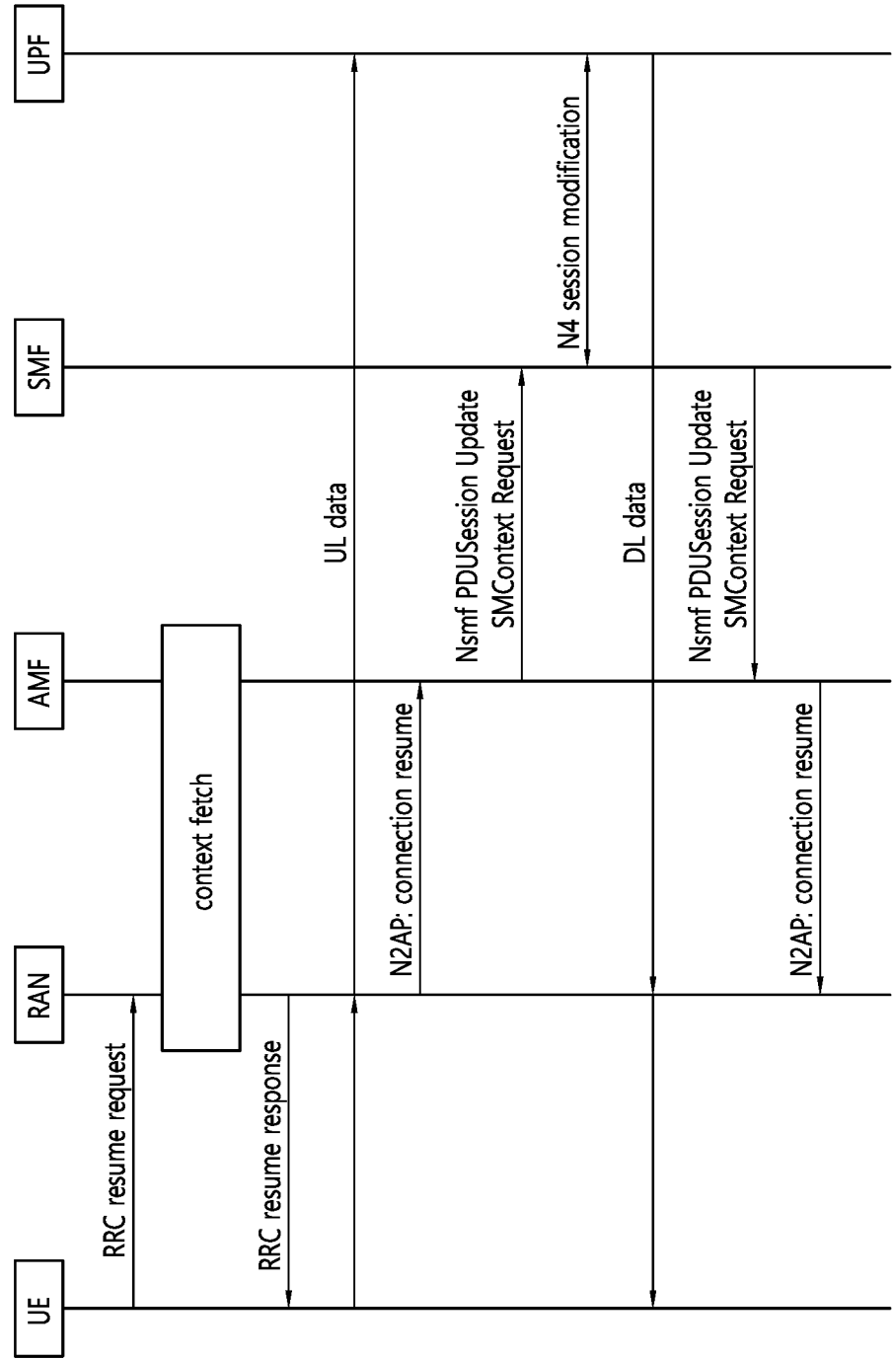
FIG. 8 shows a method for MO data transmission.

FIG. 8 shows a method for MO data transmission. Referring to FIG. 8, when the CP-UP separation and the CU-DU split are applied to the NG-RAN, it is difficult to optimize the small data transmission for the UEs using UP CIoT optimization because there is no user plane connection between the gNB-DU and the gNB-CU-CP. This convention is to support the uplink data fast transmission for UP CIoT Optimzation.

When the UE in the RRC_CONNECTED state enters into the RRC_IDLE with suspended state due to the inactivity, the gNB-CU-CP may trigger the NGAP UE Context Suspend procedure towards the 5GC and the E1AP bearer context modification procedure towards the gNB-CU-UP. In addition, it also performs the F1 UE context release procedure to disconnect the RRC connection. This means that when the UE tries to resume the RRC connection due to the small uplink data, there is no user plane connection between the gNB-DU and the gNB-CU-UP. Therefore, the gNB-CU-CP should initiate the UE context setup procedure to establish the UP connection between the gNB-DU and the gNB-CU-UP, thus causing unnecessary E1AP and F1AP signalling. Therefore, a method for reducing the unnecessary signaling to support the UDFT for the UP CIoT optimization may be required.

In this disclosure, gNB-CU and gNG-DU may be referred as CU and DU, respectively. The CU may include CP (CU-CP) and UP (CU-UP). Further, CU and DU may be embodied by the base station. The base station may be, for example, gNB or eNB. Further, the uplink data fast transmission may be referred as early data transmission.

Figure 9:
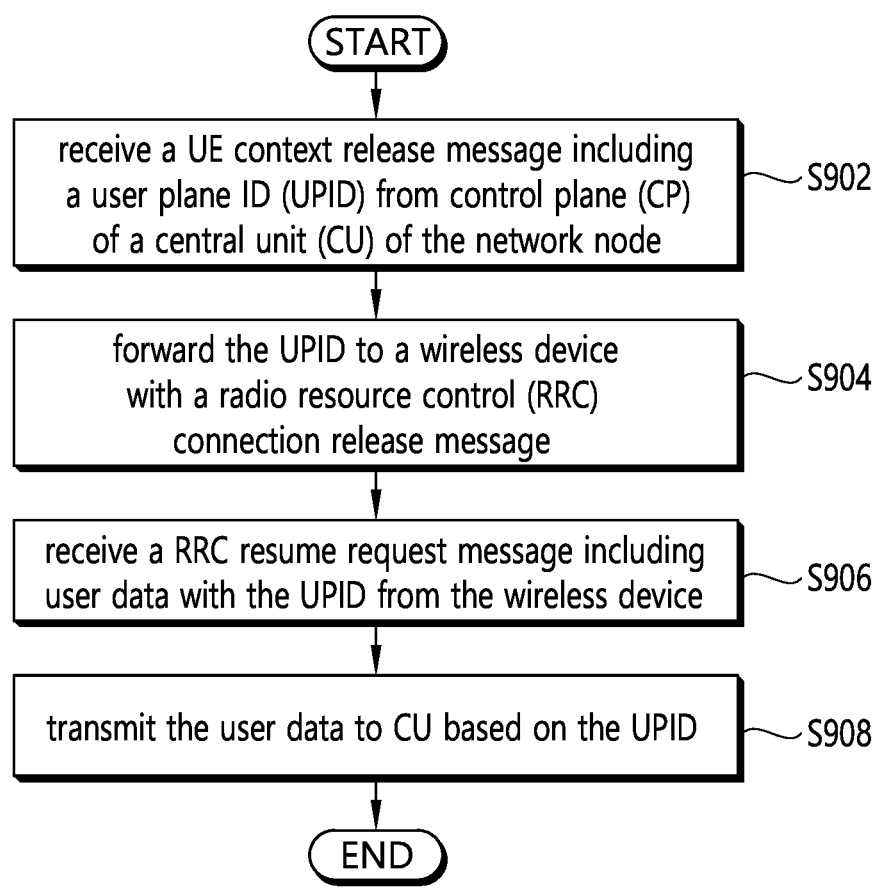
FIG. 9 shows a method for uplink data fast transmission according to an embodiment of the present disclosure.

FIG. 9 shows a method for uplink data fast transmission according to an embodiment of the present disclosure.

In step S902, a distributed unit (DU) of a network node may receive a UE context release message including a user plane ID (UPID) from control plane (CP) of a central unit (CU) of the network node. The UPID may inform that the user UPID is for uplink data fast transmission.

In step S904, the DU may forward the UPID to a wireless device with a radio resource control (RRC) connection release message. The UPID may be stored in the wireless device while in RRC inactive state or RRC idle state. The wireless device may communicate with at least one of a mobile terminal, a network or autonomous vehicles other than the wireless device.

Further, the DU may be indicated to delete the UPID upon forwarding the UPID to the wireless device.

In step S906, the DU may receive a RRC resume request message including user data with the UPID from the wireless device. The user data may be mobile oriented (MO) data.

In step S908, the DU may transmit the user data to CU based on the UPID. The uplink data transmission may be performed without state transition of the wireless device. The transmitting the user data may include multiplexing the user data with the RRC resume request message.

According to embodiments of the present disclosure, the DU may quickly deliver to the CU-UP the MO data due to the UE assisted information. Therefore, the UE's experience may be improved since the unnecessary latency due to the data retransmission can be reduced.

According to an embodiment of the present disclosure, when the connection for the UE is established, the CU-UP may pre-allocate the F1 UL UP TNL Information for the uplink data fast transmission (UDFT). This TNL address information may be allocated per UE. When the UE enters into the RRC_IDLE with Suspended state, the DU may provide it to the UE. For the next resumption, the UE may provide to the DU to quickly forward the UL data to the CU-UP having the suspended UE context.

In this disclosure, a UE may be not only a terminal device, but also any types of device operating as wireless device, for example, an integrated access backhaul (IAB) node. Therefore, a UE may be referred as a wireless device.

According to embodiments of the present disclosure, the DU may quickly deliver to the CU-UP the MO data due to the UE assisted information. Therefore, the UE's experience may be improved since the unnecessary latency due to the data retransmission can be reduced.

Figure 10:
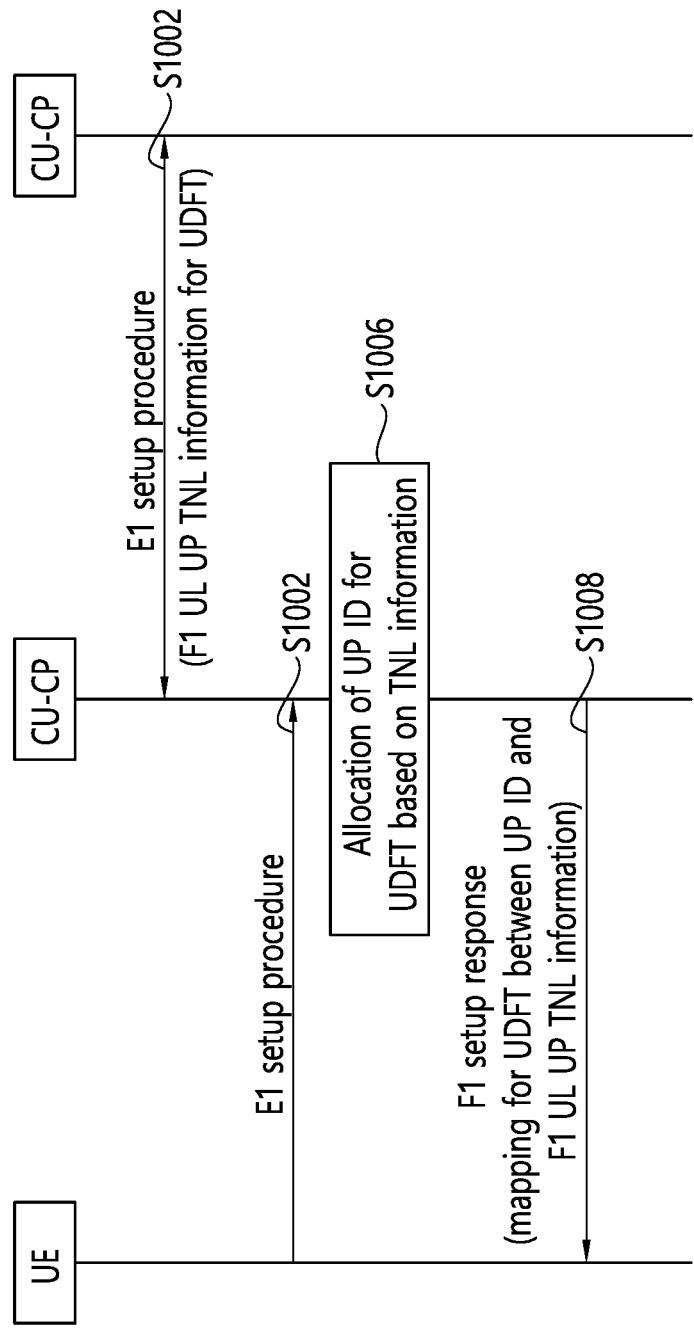
FIG. 10 shows a method for uplink data fast transmission according to an embodiment of the present disclosure.

FIG. 10 shows a method for uplink data fast transmission according to an embodiment of the present disclosure. In this embodiment, a F1 and E1 startup procedure with preconfigured F1 UL UP TNL Information for UDFT may be provided. F1 connection, which is also referred as F1 in brief, may be connection between Du and CU. E1 connection, which is also referred as E1 in brief, may be connection between CU-CP and CU-UP. This procedure may be used when the dedicated F1 UL UP TNL Information for UDFT are preconfigured in the DU. If the pre-configuration for the F1 UL UP TNL Information for UDFT is not used, this procedure may be skipped.

In step S1002, either the CU-CP or the CU-UP may initiate the E1 Setup procedure to exchange application level data needed for the CU-UP and the CU-CP to correctly interoperate on the E1 interface. For the UL data fast forwarding for UP CIoT Optimization, the CU-UP may pre-allocate the F1 UL UP TNL Information for UDFT and send it to the CU-CP. The QoS parameters about the DRB for supporting the UDFT may be preconfigured in the CU-CP and the CU-UP, if necessary.

In step S1004, the DU may send an F1 setup request message to the CU. The F1 setup request message may include a list of cells that are configured and ready to be activated. The sequence of step S1002 and S1004 may be reversed.

In step S1006, on receiving the F1 UL UP TNL Information for UDFT from the CU-UP, the CU-CP may establish a mapping table between the F1 UL UP TNL Information for UDFT and its unique UP ID.

In step S1008, the CU-CP may send to the DU the F1 setup response message. The F1 setup response message may include the mapping table between the UP ID and the F1 UL UP TNL Information for UDFT. If the QoS parameters about the DRB for supporting the UDFT may be preconfigured in step S1002. The QoS parameters about the DRB may be also included in the F1 setup response message.

According to embodiments of the present disclosure, the DU may quickly deliver to the CU-UP the MO data due to the UE assisted information. Therefore, the UE's experience may be improved since the unnecessary latency due to the data retransmission can be reduced.

Figure 11:
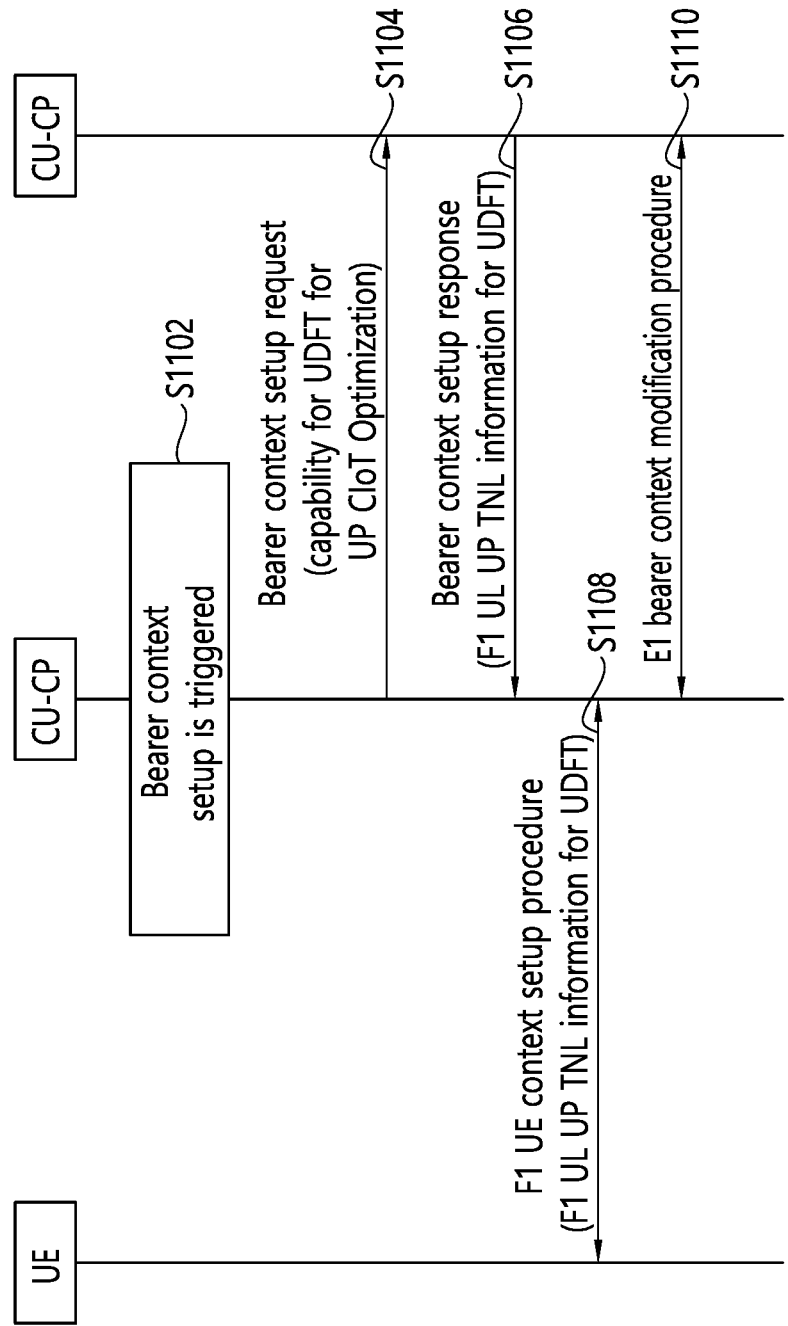
FIG. 11 shows a method for uplink data fast transmission according to an embodiment of the present disclosure.

FIG. 11 shows a method for uplink data fast transmission according to an embodiment of the present disclosure. In this embodiment, a Bearer Context Setup procedure over F1-U considering UDFT for UP CIoT Optimization may be provided.

If the pre-configuration for the F1 UL UP TNL Information for UDFT is used, the procedure described in FIG. 10 may be performed prior to the beginning of this procedure.

In step S1102, bearer context setup for the UE supporting UDFT for UP CIoT Optimization may be triggered in CU-CP.

In step S1104, the CU-CP may send a bearer context setup request message to CU-UP to setup the bearer context in the CU-UP. The bearer context setup request message may include UL TNL address information for S1-U or NG-U. Further, the bearer context setup request message may include DL TNL address information for X2-U or Xn-U. For NG-RAN, the CU-CP may decide flow-to-DRB mapping and send the generated SDAP and PDCP configuration to the CU-UP.

The capability for UDFT for UP CIoT Optimization may be included in the bearer context setup request message to indicate to the CU-UP that based on the UE capability, the F1 UL UP TNL Information for UDFT is required to support the UDFT for that UE.

In step S1106, the CU-UP may transmit a bearer context setup response message in response to the bearer context setup request message. The bearer context setup response message may contain the UL TNL address information for F1-U. The bearer context setup response message may contain DL TNL address information for S1-U or NG-U. The bearer context setup response message may contain UL TNL address information for X2-U or Xn-U.

When the indication about the capability for UDFT for UP CIoT Optimization is included in step S904, the CU-UP may contain at least one TNL address information for the UDFT. If the procedures described in FIG. 10 is triggered in advance, the CU-UP may select at least one TNL address among the preconfigured F1 UL UP TNL Information for UDFT.

If the QoS parameters about the DRB for supporting the UDFT are preconfigured, this may be guaranteed.

In step S1108, F1 UE context setup procedure may be performed to setup one or more bearers in the DU. The TNL address received in step S1106 may be also sent to the DU. If the QoS parameters about the DRB for supporting the UDFT is preconfigured.

In step S1110, E1 bearer context modification procedure may be performed to modify one or more bearers in the CU-UP.

According to embodiments of the present disclosure, the DU may quickly deliver to the CU-UP the MO data due to the UE assisted information. Therefore, the UE's experience may be improved since the unnecessary latency due to the data retransmission can be reduced.

Figure 12:
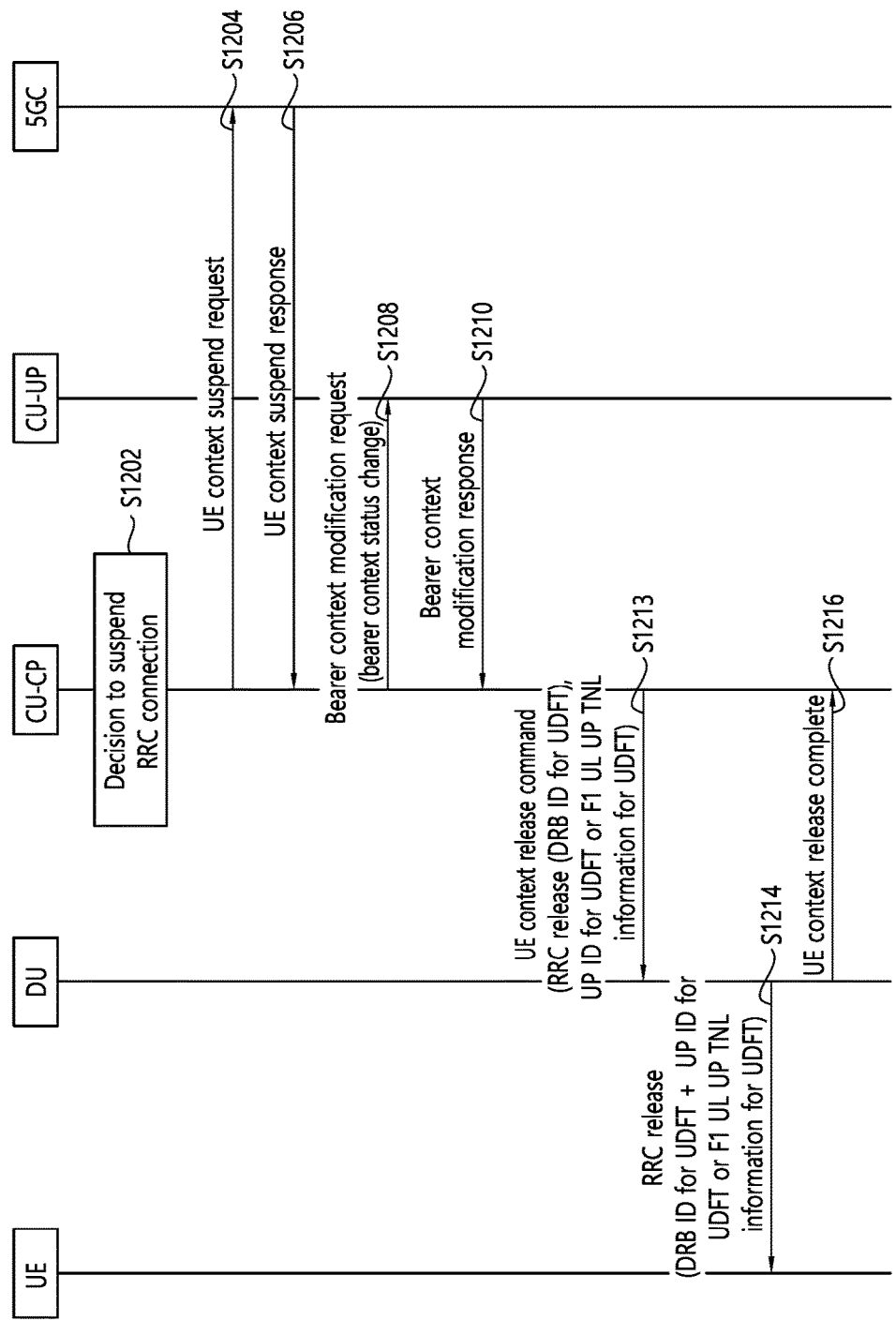
FIG. 12 shows a method for uplink data fast transmission according to an embodiment of the present disclosure.

FIG. 12 shows a method for uplink data fast transmission according to an embodiment of the present disclosure. In this embodiment, a procedure for RRC_CONNECTED to RRC_IDLE with suspended state transition considering UDFT for UP CIoT Optimization may be provided.

If the pre-configuration for the F1 UL UP TNL Information for UDFT is used, the procedure described in FIG. 10 may be performed prior to the beginning of this procedure.

In step S1202, the CU-CP may determine that the UE should enter RRC_IDLE with suspended by UP CIoT Optimization (e.g., User inactivity).

In step S1204, the CU-CP may transmit UE context suspend request message to 5GC. In other words, CU-CP may initiate the NGAP UE context suspend procedure or new procedure to inform the 5GC that the RRC connection is being suspended by sending the UE context suspend request message or new message.

In step S1206, the 5GC may transmit UE context suspend response message to the CU-CP. In specific, the 5GC may determine to disable NG DL TEID for the PDU session as UE goes to RRC_IDLE with suspended while 5GC keeps NG UL TEID to allow uplink data fast transmission when UE resumes the RRC connection. After that, the 5GC may transmit acknowledgement for the UE context suspend request message.

In step S1208, the CU-CP may send bearer context modification request message to the CU-UP. The bearer context modification request message may be transmitted with a bearer context status change indication set to "RRC suspended". The bearer context status change indication may indicate that the UE is entering RRC_IDLE with suspended state and NG UL TEID is active at the 5GC for the UDFT. The CU-CP may keep the F1 UL TEIDs.

In step S1210, the CU-UP may send the bearer context modification response message to CU-CP. The bearer context modification response message may include the PDCP UL and DL status that may be needed for e.g., data volume reporting. The CU-UP may keep at least one of the bearer context, the UE-associated logical E1-connection, the NG-U related resource (e.g., NG-U DL TEIDs) or the F1 UL TEIDs.

In step S1212, the CU-CP may send the UE context release command message to the DU serving the UE. The UE context release command message may contain information on user plane connection between the DU and the CU-UP. The information may be at least one of the UP ID for UDFT or F1 UL UP TNL Information for UDFT. The UE context release command message may be a RRC Release message or new message to be sent to the UE.

If the procedures described in FIG. 10 is performed in advance, the UP ID for UDFT may be included in the UE context release command message. If not, the F1 UL UP TNL Information for UDFT may be sent to the DU.

The RRC Release message may contain the DRB ID for UDFT which indicates to the UE that this DRB is used for UDFT. However, if the RRC Establishment Cause for UDFT in UP CIoT Optimization is newly defined in CT1 working group, this ID may be not included into the RRC message.

In step S1214, the DU may send the RRC Release message or new message to the UE. On receiving the UP ID for UDFT or F1 UL UP TNL Information for UDFT described in step S1212, the DU may forward it to the UE (e.g., by sending this information as the part of DL PDU, or by including this information into the header of MAC, RCL layer).

When the RRC message includes the DRB ID for UDFT, the UE may store it for next resumption for the UDFT. In addition, when the information related to the UDFT (i.e., UP ID or TNL address) is received, the UE may store it for next resumption for the UDFT.

In step S1216, the DU may send the UE context release complete message to the CU-CP.

According to embodiments of the present disclosure, the DU may quickly deliver to the CU-UP the MO data due to the UE assisted information. Therefore, the UE's experience may be improved since the unnecessary latency due to the data retransmission can be reduced.

Figure 13:
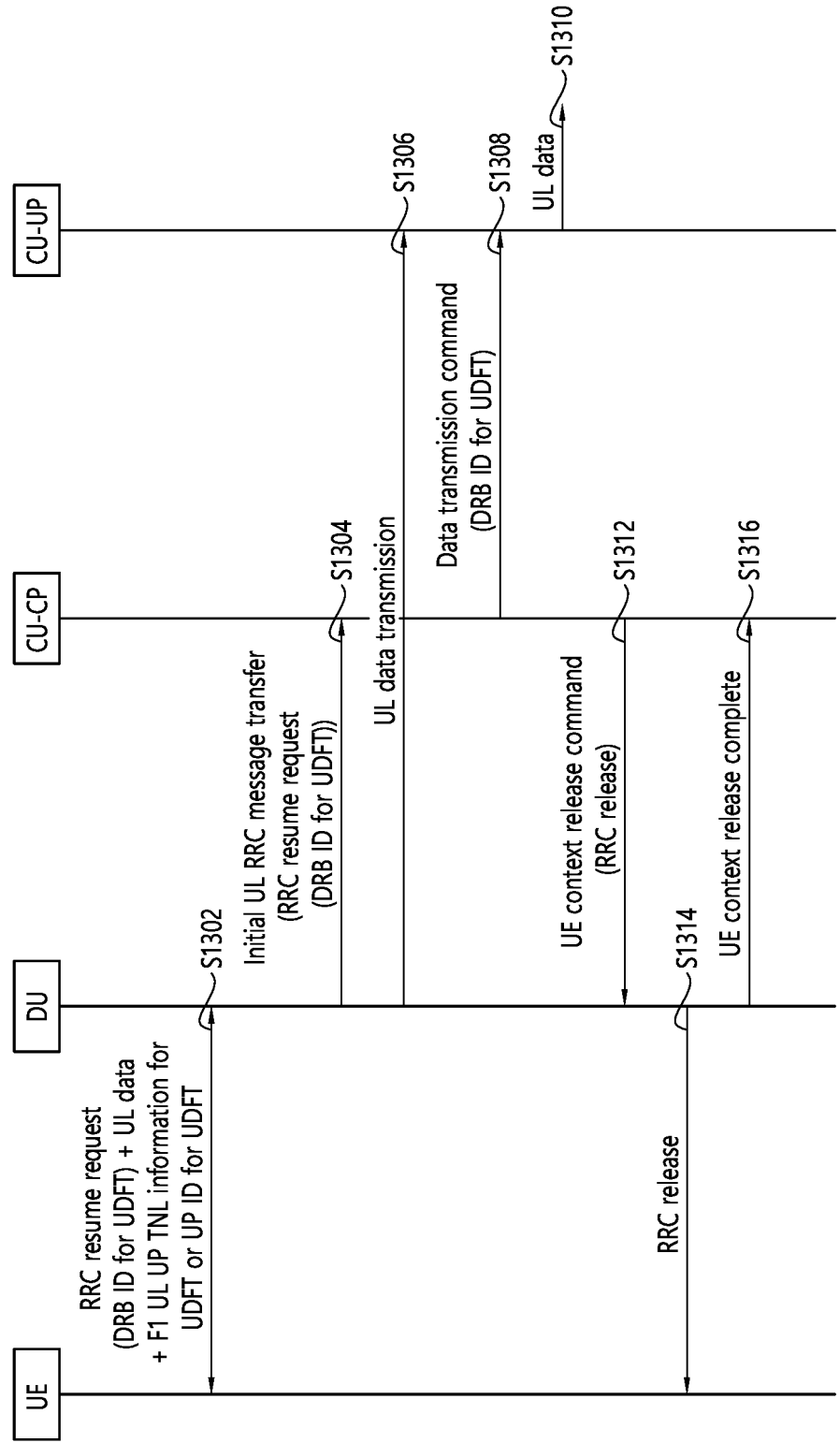
FIG. 13 shows a method for uplink data fast transmission according to an embodiment of the present disclosure.

FIG. 13 shows a method for uplink data fast transmission according to an embodiment of the present disclosure. In this embodiment, a procedure for UDFT for UP CIoT Optimization without subsequent DL may be provided. The procedures in this embodiment may be performed on the assumption that the UE already received UP ID from DU, as described in FIG. 12. The UP ID may be at least one of the UP ID for UDFT or F1 UL UP TNL Information for UDFT.

If the pre-configuration for the F1 UL UP TNL Information for UDFT is used, the procedure described in FIG. 10 may be performed prior to the beginning of this procedure.

In step S1302, upon connection resumption request for Mobile Originated data from the upper layers, the UE may transmit RRC resume request message to DU. In specific, the UE may initiate the uplink data fast transmission procedure and select a random access preamble configured for UDFT. Then, the UE may send an RRC resume request message or new message to the DU. The RRC resume request message may include the information on user plane connection between the DU and the CU-UP, if it was received in FIG. 10. The information may be DRB ID for UDFT. This ID may indicate to the CU-CP that this transmission is for the UDFT. However, if the RRC establishment cause for UDFT in UP CIoT Optimization is newly defined in CT1 working group, this ID may be not included into the RRC message.

The user data may be ciphered and transmitted on DTCH multiplexed with the RRC resume request message on CCCH. The UE may also provide to the DU the UP ID or TNL address information which was received in FIG. 10, in order to enable the DU to quickly forward the UL data to the CU-UP storing the UE context.

In step S1304, in the DU, the UL data may be de-multiplexed with the RRC resume request message. Then, the DU may include the RRC message and, if the UE is admitted, the corresponding low layer configuration for the UE in the initial UL RRC message transfer message and transfer to the CU. The initial UL RRC message transfer message may include the C-RNTI allocated by the DU.

In step S1306, if the UP ID is included into the RRC resume request message, the DU may be able to find the TNL address information for the CU-UP having the suspended UE context based on the mapping table which is preconfigured in FIG. 8. If the F1 UL UP TNL information is received, the DU may take advantage of the F1 UL UP TNL information to easily forward the UL data to the corresponding CU-UP.

If the QoS parameters about the DRB for supporting the UDFT are preconfigured, the DU may use the QoS parameters to forward the UL data to the CU-UP.

However, the CU-UP may not know whether the CU-CP is able to identify the UE context. Further, CU-UP may not know whether the access to the CU-CP is valid for the UE. Therefore, the CU-UP may buffer the UL data received from the DU.

In step S1308, the CU-CP may send the data transmission command message or new message containing the DRB ID for UDFT to indicate to the CU-UP that the UE authentication is successfully validated.

In specific, on receiving the initial UL RRC message transfer message in step S1304, the gNB may be aware of the UDFT by the DRB ID in the RRC message or the relevant RRC establishment cause (e.g., MO data for UDFT). Then, the CU-CP may check whether it is able to find the UE context or not. When the CU-CP is able to identify the UE context, the CU-CP may decide whether the RRC state transition is needed or not. The CU-CP may determine whether the RRC state transition is needed, based on the expected UE behavior, AS based Release Assistance Information by UE, and so on. When no further subsequent data are expected or there is only one acknowledgement for the UL data, the CU-CP may decide to keep the UE in RRC_IDLE with suspended state. If not, the CU-CP may decide to move the UE in RRC_CONNECTED state for potential subsequent UL or DL.

When there is no subsequent UL or DL data, the CU-CP may send the data transmission command message or new message containing the DRB ID for UDFT to indicate to the CU-UP that the UE authentication is successfully validated.

In step S1310, the CU-UP just forwards the UL data to the UPF by using NG UL TEID in the AS context.

In step S1312, the CU-CP may send the UE context release command message to the DU serving the UE. The UE context release command message may be transmitted together with the RRC release message to be sent to the UE.

In step S1314, the DU may send the RRC release message to the UE.

In step S1316, the DU may send the UE context release complete message to the CU-CP.

According to embodiments of the present disclosure, the DU may quickly deliver to the CU-UP the MO data due to the UE assisted information. Therefore, the UE's experience may be improved since the unnecessary latency due to the data retransmission can be reduced.

According to an embodiment of the present disclosure, it may be suggested that the CU-UP may pre-allocate the common F1 UL UP TNL Information for the uplink data fast transmission (UDFT), before the connection for the UE is established. This TNL address information may be allocated per the UEs within a certain areas consisting of DU(s) connected to a specific CU-UP. When the UE enters into the RRC_IDEL with suspended state, the DU may provide it to the UE. For the next resumption, the UE may provide to the DU to quickly forward the UL data to the CU-UP having the suspended UE context.

Figure 14:
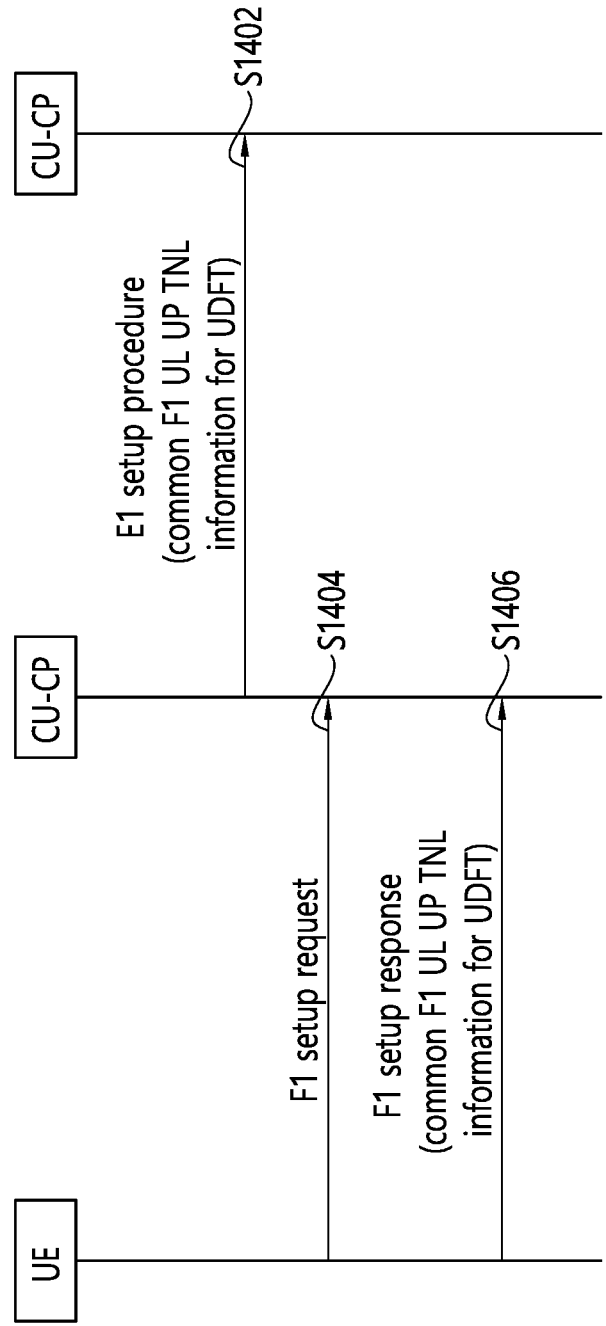
FIG. 14 shows a method for uplink data fast transmission according to an embodiment of the present disclosure.

FIG. 14 shows a method for uplink data fast transmission according to an embodiment of the present disclosure. In this embodiment, a F1 and E1 startup procedure with preconfigured common F1 UL UP TNL Information for UDFT may be provided. This procedure may be used when the common F1 UL UP TNL Information for UDFT are preconfigured in the DU.

In step S1402, either the CU-CP or the CU-UP may initiate the E1 Setup procedure to exchange application level data needed for the CU-UP and the CU-CP to correctly interoperate on the E1 interface. For the UL data fast forwarding for UP CIoT Optimization, the CU-UP may pre-allocate the common F1 UL UP TNL Information for UDFT and send it to the CU-CP in this step. This TNL information may be commonly used for the UEs within a certain areas consisting of DU(s) connected to a specific CU-UP.

If required, the QoS parameters about the DRB for supporting the UDFT may be preconfigured in the CU-CP and the CU-UP in this step.

In step S1404, the DU may send an F1 setup request message to the CU. The F1 setup request message may include a list of cells that are configured and ready to be activated.

The step S1402 may be performed after step S1404.

In step S1406, the CU-CP may send to the DU the F1 setup response message. The F1 setup response message may include the common F1 UL UP TNL Information for UDFT. If the QoS parameters about the DRB for supporting the UDFT are preconfigured in step S1402, the QoS parameters may be also included into the F1 setup response message.

Figure 15:
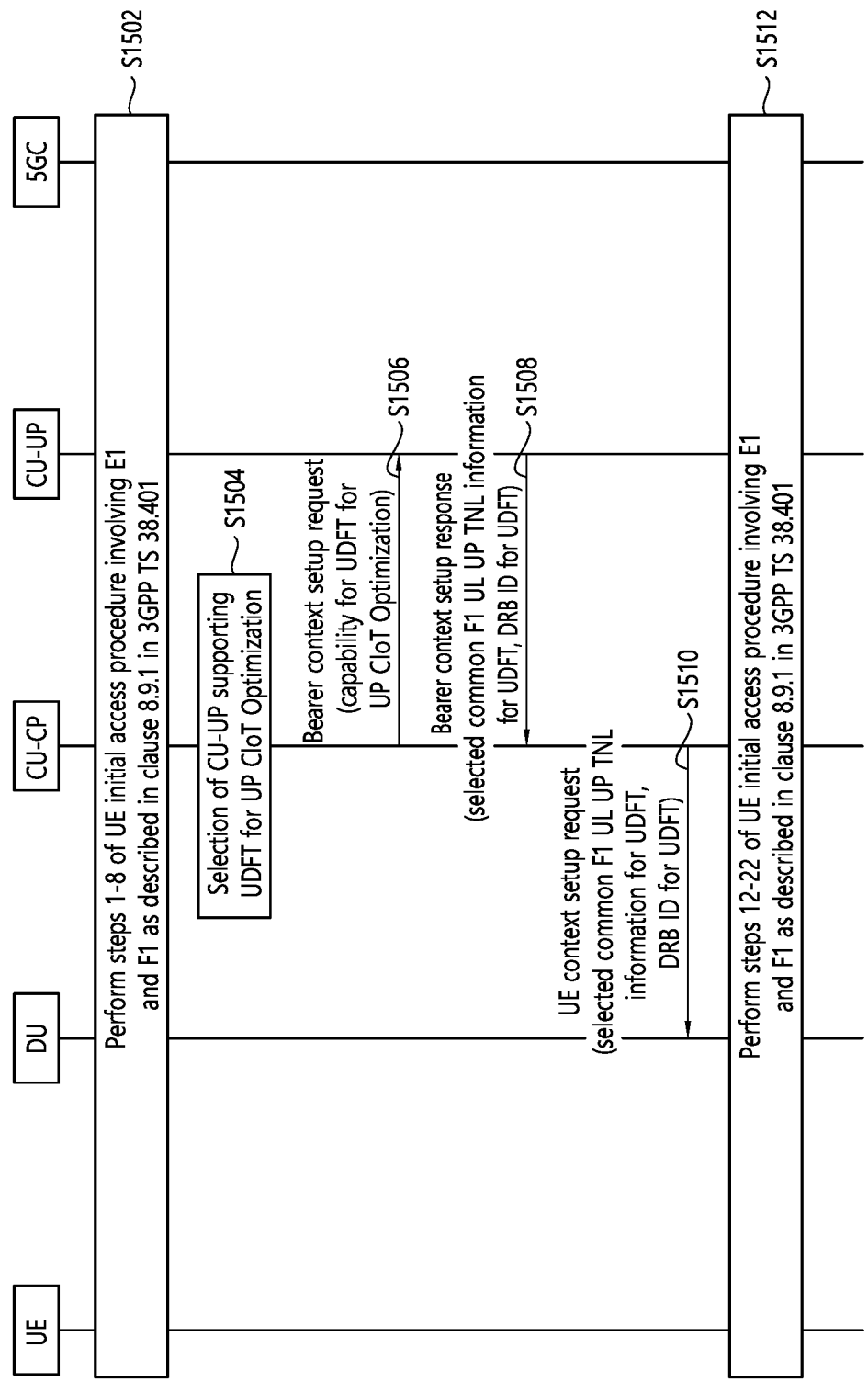
FIG. 15 shows a method for uplink data fast transmission according to an embodiment of the present disclosure.

FIG. 15 shows a method for uplink data fast transmission according to an embodiment of the present disclosure. In this embodiment, the UE initial access procedure involving E1 and F1 with common F1 UL UP TNL Information for UDFT may be provided. The procedure described in FIG. 12 may be performed prior to the beginning of this procedure.

In step S1502, steps 1-8 of UE initial access procedure involving E1 and F1 as described in clause 8.9.1 in 3GPP TS 38.401 may be performed.

In specific, The UE may send an RRC setup request message to the DU. The DU may include the RRC message and, if the UE is admitted, the corresponding low layer configuration for the UE in the initial UL RRC message transfer message and transfers to the CU. The initial UL RRC message transfer message includes the C-RNTI allocated by the DU. The CU may allocate a CU UE F1AP ID for the UE and generate a RRC setup message towards UE. The RRC message may be encapsulated in the DL RRC message transfer message. The DU may send the RRC setup message to the UE. The UE may send the RRC connection setup complete message to the DU. The DU may encapsulate the RRC message in the UL RRC message transfer message and send it to the CU. The CU may send the initial UE message to the AMF. The AMF may send the initial context setup request message to the CU.

In step S1504, the CU-CP may select the proper CU-UP to support the UDFT for UP CIoT Optimization. The CU-CP may select the proper CU-UP based on at least one of the CU-UP capability for the common F1 UL UP TNL Information, or location between each DU and CU-UP.

In step S1506, the CU-CP may send a bearer context setup request message to CU-UP to setup the bearer context in the CU-UP. The CU-UP may be the selected CU-UP in step S1304. The bearer context setup request message may contain UL TNL address information for S1-U or NG-U. Further, the bearer context setup request message may contain DL TNL address information for X2-U or Xn-U. For NG-RAN, the CU-CP may decide flow-to-DRB mapping and send the generated SDAP and PDCP configuration to the CU-UP.

The capability for UDFT for UP CIoT Optimization may be included into the bearer context setup request message to indicate to the CU-UP that based on the UE capability, the F1 UL UP TNL Information for UDFT is required to support the UDFT for that UE.

In step S1508, the CU-UP may respond with a bearer context setup response message to CU-CP. The bearer context setup response message may contain at least one of the UL TNL address information for F1-U, DL TNL address information for S1-U or NG-U, or UL TNL address information for X2-U or Xn-U.

When the indication about the capability for UDFT for UP CIoT Optimization is included in step S1306, the CU-UP may contain at least one among the preconfigured common F1 UL UP TNL Information for UDFT. If the QoS parameters about the DRB for supporting the UDFT are preconfigured, this may be guaranteed.

In step S1510, F1 UE context setup procedure may be performed to setup one or more bearers in the DU. The TNL address received in step S1308 may be also sent to the DU. If the QoS parameters about the DRB for supporting the UDFT are preconfigured, this may be guaranteed.

In step S1512, steps 12-22 of UE initial access procedure involving E1 and F1 as described in clause 8.9.1 in 3GPP TS 38.401 may be performed.

In specific, the UE may respond with the security mode complete message. The DU may encapsulate the RRC message in the UL RRC message transfer message and sends it to the CU. The CU-CP may send the bearer context modification request message to the CU-UP, including F1-U DL TEID and transport layer address allocated by DU. The CU-UP may send the bearer context modification response message to the CU-CP. The UE may send RRC reconfiguration complete message to the DU. The DU may encapsulate the RRC message in the UL RRC message transfer message and send it to the CU. The CU may send the initial context setup response message to the AMF.

Figure 16:
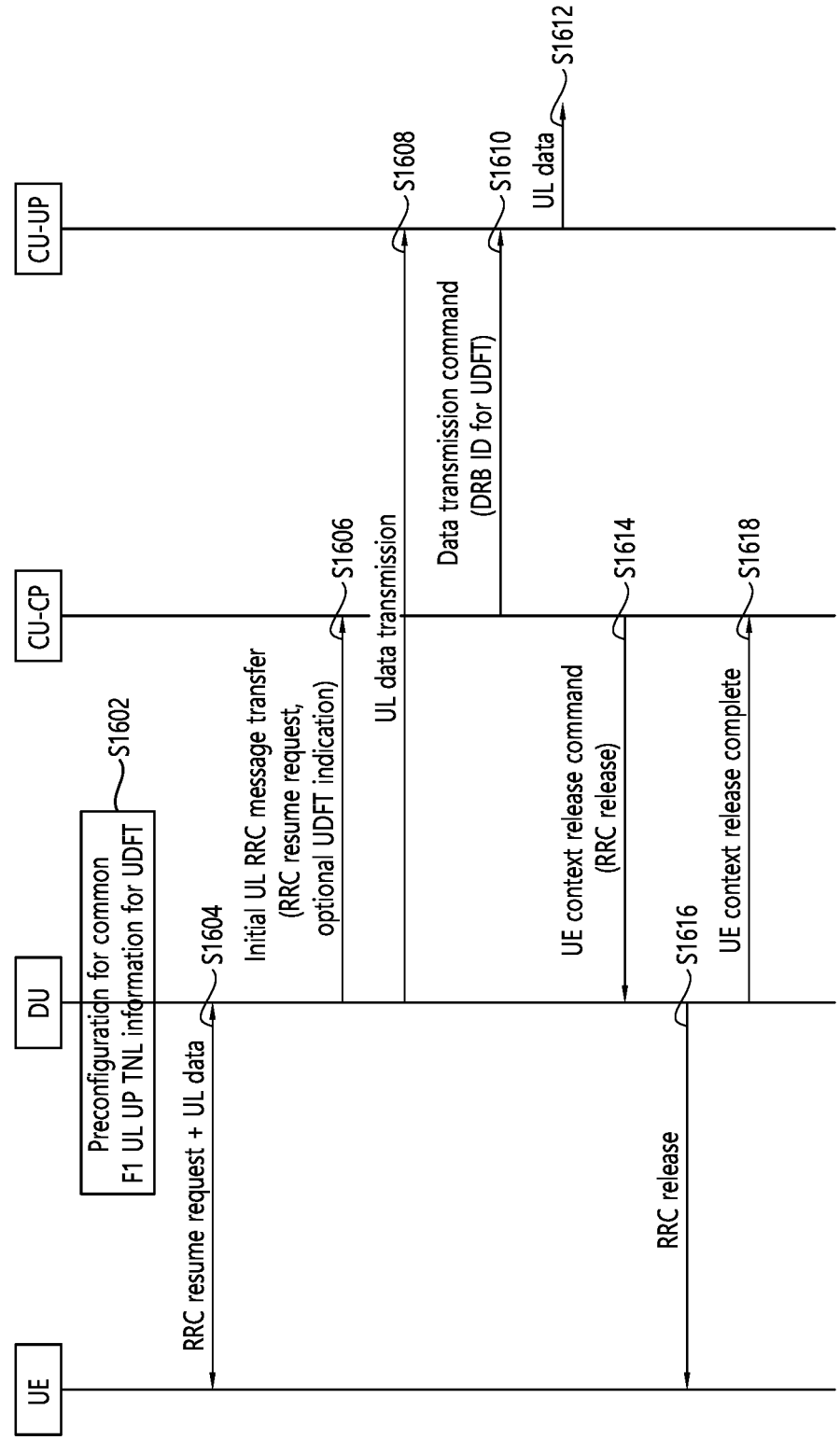
FIG. 16 shows a method for uplink data fast transmission according to an embodiment of the present disclosure.

FIG. 16 shows a method for uplink data fast transmission according to an embodiment of the present disclosure. In this embodiment, a procedure for UDFT for UP CIoT Optimization without subsequent DL and with common F1 UL UP TNL Information may be proposed. The procedure described in FIG. 14 may be performed prior to the beginning of this procedure. Therefore, common F1 UL UP TNL information for UDFT may be preconfigured in DU.

In step S1602, the DU may be preconfigured for common F1 UL UP TNL information for UDFT as described in FIG. 15. Thus, the DU may efficiently determine appropriate UP when UL data is received from a UE.

In step S1604, the UE may transmit RRC resume request message to DU. In specific, upon connection resumption request for mobile originated data from the upper layers, the UE may initiate the uplink data fast transmission procedure and selects a random access preamble configured for UDFT.

Then, the UE may send an RRC resume request message or new message to the DU. The user data may be ciphered and transmitted on DTCH multiplexed with the RRC resume request message on CCCH. If the RRC establishment cause for UDFT in UP CIoT Optimization is newly defined, the newly defined element may be included into the RRC message.

In step S1606, in the DU, the UL data may be de-multiplexed with the RRC resume request message. Then, the DU may include the corresponding low layer configuration for the UE in the initial UL RRC message transfer message into the RRC message, and the DU may transfer it to the CU. The initial UL RRC message transfer message may include the C-RNTI allocated by the DU.

If the RRC establishment cause for UDFT in UP CIoT Optimization is newly not defined, the UDFT indication may be included to indicate to the CU-CP that this is for the UDFT.

In step S1608, the DU may transmit UL data to CU-UP. Since the common F1 UL UP TNL information is already configured in the DU, the UL data may be easily forwarded to the corresponding CU-UP having the suspended UE context.

If the QoS parameters about the DRB for supporting the UDFT are preconfigured, the DU may use it to forward the UL data to the CU-UP. However, the CU-UP may not know whether the CU-CP is able to identify the UE context and the UE access to the CU-CP is valid. Therefore, the CU-UP just may buffer the UL data received from the DU.

In step S1610, on receiving the initial UL RRC message transfer message in step S1604, the CU-CP may be aware of the UDFT indication by the DU or the relevant RRC establishment cause (e.g., MO data for UDFT). Then, the CU-CP may check whether it is able to find the UE context or not. When the CU-CP is able to identify the UE context, the CU-CP may decide whether the RRC state transition is needed or not. The CU-CP may determine whether the RRC state of the UE is needed or not based on the expected UE behavior, AS based Release Assistance Information by UE, and so on. When no further subsequent data are expected or there is only one acknowledgement for the UL data, the CU-CP may decide to keep the UE in RRC_IDLE with suspended state. If not, the CU-CP may decide to move the UE in RRC_CONNECTED state for potential subsequent UL or DL.

When there is no subsequent UL or DL data, the CU-CP may send the data transmission command message or new message containing the DRB ID for UDFT to indicate to the CU-UP that the UE authentication is successfully validated.

In step S1612, the CU-UP may just forward the UL data to the UPF by using NG UL TEID in the AS context.

In step S1614, the CU-CP may send the UE context release command message to the DU serving the UE, together with the RRC Release message to be sent to the UE.

In step S1616, the DU may send the RRC release message to the UE.

In step S1618, the DU may send the UE context release complete message to the CU-CP.

According to embodiments of the present disclosure, the DU may quickly deliver to the CU-UP the MO data based on the UE assisted information. Therefore, UE's experience may be improved since the unnecessary latency due to the data retransmission can be reduced. Further, the pre-allocated TNL address since some UEs share the transport network layer for data streams over F1 may be reduced.

Figure 17:
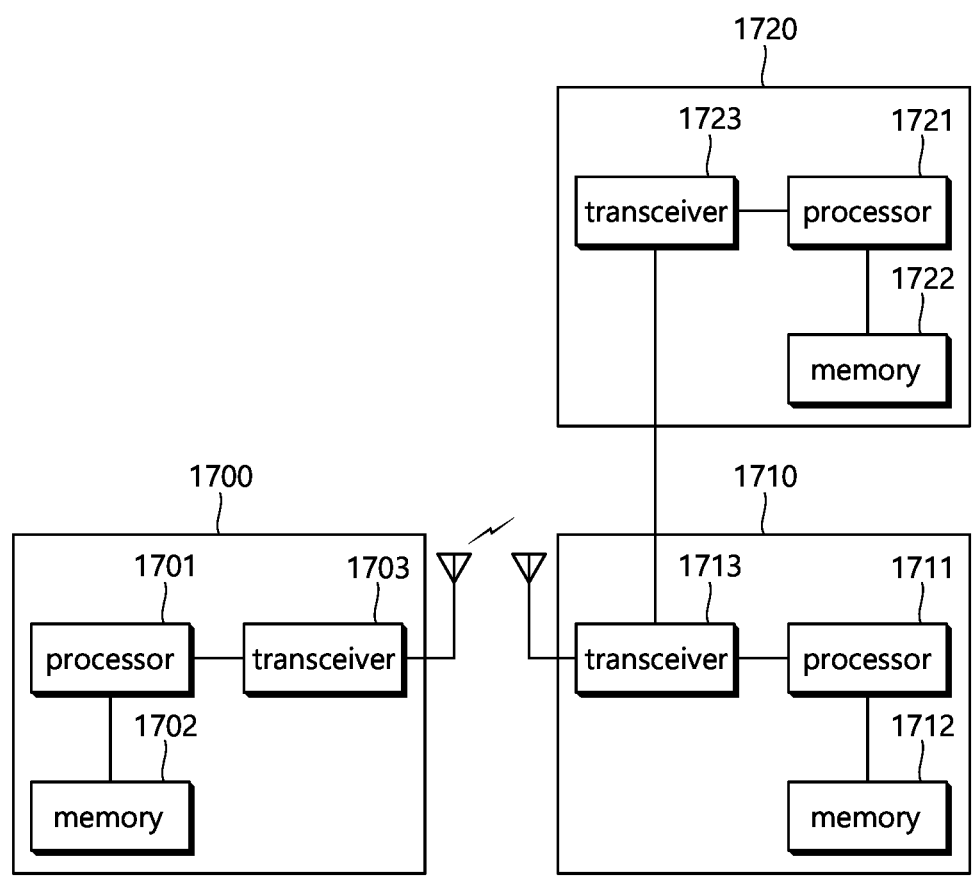
FIG. 17 is a block diagram illustrating a wireless apparatus in which an embodiment of the present disclosure can be implemented.

FIG. 17 is a block diagram illustrating a wireless apparatus in which an embodiment of the present disclosure can be implemented.

A wireless device 1700 includes a processor 1701, a memory 1702, and a transceiver 1703. The memory 1702 is coupled to the processor 1701, and stores a variety of information for driving the processor 1701. The transceiver 1703 is coupled to the processor 1701, and transmits and/or receives a radio signal. The processor 1701 implements the proposed functions, procedures, and/or methods. In the aforementioned embodiments, an operation of the wireless device 1700 may be implemented by the processor 1701.

A distributed unit (DU) 1710 includes a processor 1711, a memory 1712, and a transceiver 1713. The memory 1712 is coupled to the processor 1711, and stores a variety of information for driving the processor 1711. The transceiver 1713 is coupled to the processor 1711, and transmits and/or receives a radio signal. The processor 1711 implements the proposed functions, procedures, and/or methods. In the aforementioned embodiments, an operation of the wireless device 1710 may be implemented by the processor 1711.

The central unit (CU) 1720 includes a processor 1721, a memory 1722 and a transceiver 1723. The memory 1722 is coupled to the processor 1721 to store various information for driving the processor 1721. Transceiver 1723 is coupled to processor 1721 to transmit and/or receive wireless signals. Processor 1721 implements the proposed functionality, process and/or method. In the above-described embodiment, the operation of the CU can be implemented by the processor 1721.

The processors may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

According to an embodiment of the present disclosure, the processor 1710 may be configured to receive a UE context release message including a user plane ID (UPID) from control plane (CP) of a central unit (CU) of the network node. The UPID may inform that the user UPID is for uplink data fast transmission.

The processor 1710 may be configured to forward the UPID via a radio resource control (RRC) connection release message to a wireless device. The UPID may be stored in the wireless device while in RRC inactive state or RRC idle state. The wireless device may communicate with at least one of a mobile terminal, a network or autonomous vehicles other than the wireless device.

The processor 1710 may be configured to receive a RRC resume request message including user data with the UPID from the wireless device. The user data may be mobile oriented (MO) data.

The processor 1710 may be configured to transmit the user data to CU based on the UPID. The uplink data transmission may be performed without state transition of the wireless device. The transmitting the user data may include multiplexing the user data with the RRC resume request message.

Further, the processor 1710 may be configured to delete the UPID upon forwarding the UPID to the wireless device.

According to embodiments of the present disclosure, the DU may quickly deliver to the CU-UP the MO data due to the UE assisted information. Therefore, the UE's experience may be improved since the unnecessary latency due to the data retransmission can be reduced.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner XR technology can be applied to HMD, head-up display (HUD), mobile phone, tablet PC, laptop, desktop, TV, digital signage. A device to which the XR technology is applied may be referred to as an XR device.

Figure 18:
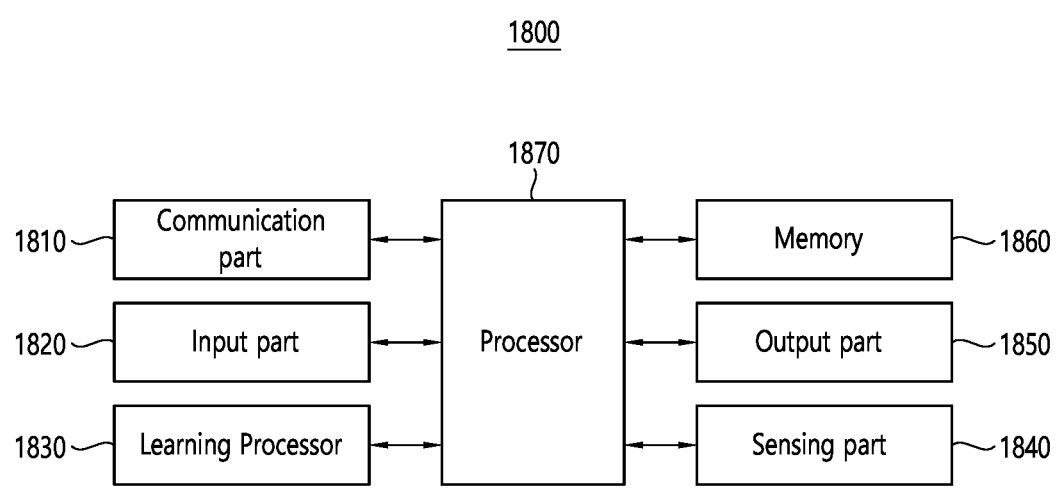
FIG. 18 shows an example of an AI device to which the technical features of the present disclosure can be applied.

FIG. 18 shows an example of an AI device to which the technical features of the disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing.

The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
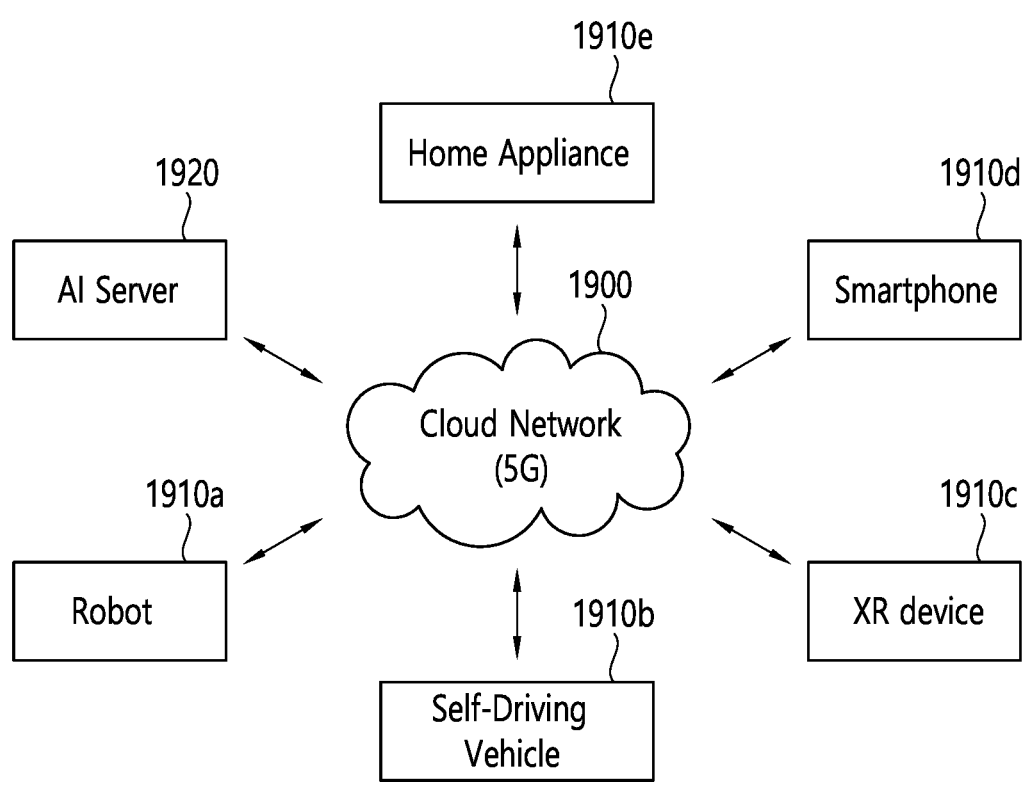
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a distributed unit (DU) of a network node adapted to operate in a wireless communication system, the method comprising:
   receiving a UE context release command message from of a central unit (CU)-control plane (CP) of the network node,
   wherein the UE context release command message includes a radio resource control (RRC) release message,
   wherein the UE context release command message includes a user plane (UP) identifier (ID) for UL data fast transmission (UDFT), and
   wherein the UP ID for UDFT is mapped to a F1 uplink (UL) user plane (UP) transport port network (TNL) information for UDFT based on a mapping table in a pre-configuration;
   transmitting the RRC release message and the UP ID for UDFT to a wireless device;
   receiving an RRC resume request message and the UP ID for UDFT from the wireless device,
   wherein user data for UDFT are multiplexed with the RRC resume request message;
   identifying TNL address information for a CU-user plane (UP) of a network based on the UP ID for UDFT and the mapping table; and
   transmitting the user data to the CU-UP,
   wherein the DU is a logical node hosting radio link control (RLC), media access control (MAC) and physical layers of the network node,
   wherein the CU-CP is a logical node hosting radio resource control (RRC) and a control plane part of a packet data convergence protocol (PDCP) of the network node, and
   wherein the CU-UP is a logical node hosting a user plane part of the PDCP of the network node.

2. The method of claim 1, further comprising:
   deleting the UP ID for UDFT upon transmitting the UP ID for UDFT to the wireless device.

3. The method of claim 1, wherein the UDFT is performed without state transition of the wireless device.

4. The method of claim 1, wherein the UP ID for UDFT is stored in the wireless device while in RRC inactive state or RRC idle state.

5. The method of claim 1,
   wherein the RRC release message includes a data radio bearer (DRB) ID for UDFT, and
   wherein the RRC resume request message includes the DRB ID for UDFT.

6. The method of claim 1, wherein the user data is mobile-oriented (MO) data.

7. The method of claim 1, wherein the wireless device communicates with at least one of a mobile terminal, a network or autonomous vehicles other than the wireless device.

8. A distributed unit (DU) of a network node adapted to operate in a wireless communication system, the DU comprising:
   a memory;
   a transceiver; and
   a processor, operably coupled to the memory and the transceiver, and configured to:
   control the transceiver to receiving a UE context release command message from a central unit (CU)-control plane (CP) of the network node,
   wherein the UE context release command message includes a radio resource control (RRC) release message,
   wherein the UE context release command message includes a user plane (UP) identifier (ID) for UL data fast transmission (UDFT), and
   wherein the UP ID for UDFT is mapped to a F1 uplink (UL) user plane (UP) transport port network (TNL) information for UDFT based on a mapping table in a pre-configuration;
   control the transceiver to transmitting the RRC release message and the UP ID for UDFT to a wireless device;
   control the transceiver to receive an RRC resume request message and the UP ID for UDFT from the wireless device,
   wherein user data for UDFT are multiplexed with the RRC resume request message;
   identify TNL address information for a CU-user plane (UP) of a network based on the UP ID for UDFT and the mapping table; and
   control the transceiver to transmit the user data to the CU-UP,
   wherein the DU is a logical node hosting radio link control (RLC), media access control (MAC) and physical layers of the network node,
   wherein the CU-CP is a logical node hosting radio resource control (RRC) and a control plane part of a packet data convergence protocol (PDCP) of the network node, and
   wherein the CU-UP is a logical node hosting a user plane part of the PDCP of the network node.

9. The DU of claim 8, wherein the processor is further configured to:
   delete the UP ID for UDFT upon transmitting the UP ID for UDFT to the wireless device.

10. The DU of claim 8, wherein the UDFT is performed without state transition of the wireless device.

11. The DU of claim 8, wherein the UP ID for UDFT is stored in the wireless device while in RRC inactive state or RRC idle state.

12. The DU of claim 8,
    wherein the RRC release message includes a data radio bearer (DRB) ID for UDFT, and
    wherein the RRC resume request message includes the DRB ID for UDFT.

13. The DU of claim 8, wherein the user data is mobile-oriented (MO) data.

* * * * *